(12) United States Patent
Sun

(10) Patent No.: US 12,237,624 B2
(45) Date of Patent: Feb. 25, 2025

(54) SAFETY DEVICE FOR SOCKET

(71) Applicant: SITRONIX TECHNOLOGY CORP., Jhubei (TW)

(72) Inventor: Shih-Chiang Sun, Jhubei (TW)

(73) Assignee: Sitronix Technology Corporation, Jhubei (TW)

( * ) Notice: Subject to any disclaimer, the term of this patent is extended or adjusted under 35 U.S.C. 154(b) by 0 days.

(21) Appl. No.: 17/709,926

(22) Filed: Mar. 31, 2022

(65) Prior Publication Data

US 2023/0051419 A1     Feb. 16, 2023

(30) Foreign Application Priority Data

Mar. 31, 2021  (TW) ................................ 110112283
Apr. 20, 2021  (TW) ................................ 110114200

(51) Int. Cl.
*H01R 13/703*     (2006.01)
*H01R 13/66*     (2006.01)
*H02H 1/00*     (2006.01)

(52) U.S. Cl.
CPC ..... *H01R 13/7036* (2013.01); *H01R 13/6683* (2013.01); *H02H 1/0007* (2013.01)

(58) Field of Classification Search
CPC ............ H01R 13/7036; H01R 13/6683; H01R 13/7035; H01R 13/665; H01R 13/44; H01R 13/66; H01R 13/6691; H02H 1/0007

See application file for complete search history.

(56) References Cited

U.S. PATENT DOCUMENTS 5,793,125 A    8/1998   Tarng
10,038,283 B2 *   7/2018   Oddsen ................. H01R 24/78
(Continued)

FOREIGN PATENT DOCUMENTS

CN     102270798 A    12/2011
CN     103138122 B     7/2015
(Continued)

OTHER PUBLICATIONS

International Search Report Issued by Foreign Patent Office in Application No. 110112283 (Document I).
(Continued)

*Primary Examiner* — Jeffrey M Shin
(74) *Attorney, Agent, or Firm* — Rosenberg, Klein & Lee

(57) ABSTRACT

The present invention provides a safety device for socket, which comprises a switching circuit, a control module, and a detection module. The switching circuit is coupled between a supply main and an internal transmission structure of a socket. The control module is coupled to and controls the switching circuit. The detection module is coupled to the control module and outputs a detection signal. The control module controls the turning-on or cutoff of the switching circuit according to the detection signal. When the plug is not inserted into the socket, the control module cuts off the switching circuit. Then the power source from the supply main will not be transmitted to the internal transmission structure of the socket. After the plug is inserted into the socket, the control module turns on the switching circuit. Then the power source from the supply main will be transmitted to the plug via the switching circuit and the internal transmission structure of the socket. Thereby, the sparks can be avoided for preventing danger as well as extending the lifetime of the socket.

19 Claims, 23 Drawing Sheets

(56) References Cited

U.S. PATENT DOCUMENTS

| | | | | |
|---|---|---|---|---|
| 2007/0149013 | A1* | 6/2007 | Eastham | H02J 13/0005 |
| | | | | 439/140 |
| 2011/0049981 | A1 | 3/2011 | Wu et al. | |
| 2016/0294125 | A1* | 10/2016 | Hsu | H01R 13/7038 |
| 2017/0104325 | A1* | 4/2017 | Eriksen | H01R 13/7135 |
| 2021/0005989 | A1* | 1/2021 | Byrne | H01H 83/00 |

FOREIGN PATENT DOCUMENTS

| | | |
|---|---|---|
| TW | M382634 U | 6/2010 |
| TW | 201036285 A | 10/2010 |
| TW | 201128861 A | 8/2011 |
| TW | I566485 B | 1/2017 |
| TW | I602361 B | 10/2017 |
| WO | 2019073224 A1 | 4/2019 |

OTHER PUBLICATIONS

International Search Report Issued By Foreign Patent Office in Application No. 110112283 (Document II).
International Search Report Issued by Foreign Patent Office in Application No. 110114200 (Document I).
International Search Report Issued by Foreign Patent Office in Application No. 110114200 (Document II).

\* cited by examiner

SAFETY DEVICE FOR SOCKET

FIELD OF THE INVENTION

The present invention relates generally to a socket, and particularly to a safety device for preventing sparks while inserting a plug into a socket.

BACKGROUND OF THE INVENTION

Sockets are normal power supplying devices. Once the plugs of electronic devices are inserted into sockets, power sources will be transferred to the electronic devices from the sockets to the electronic device via the plugs. The specifications of sockets and plugs, for example, shapes, sizes, and the supplied power sources, differ for different countries.

In general, a plug is a removable connector connected to an electronic device requiring power source via a wire; a socket is fixed on the power supplying equipment or buildings. A plug normally includes protruding metal members in stick or blade shapes for power transmission; a socket includes slots with shapes corresponding to the plug. A socket includes metal members in the slots for power transmission. The metal members of a plug are inserted into the slots of a socket. The metal members of the plug will contact the metal members in the slots.

To enhance safety, sockets and plugs include safety structures. For example, the shape of the metal members of plugs is identical to the shape of the slots of sockets for avoiding insertion of incompatible plugs to the sockets and damaging the electronic devices. In addition, many cover structures for sockets are designed, for example, socket lids, for covering the slots of sockets when no plug is present in the sockets and preventing foreign objects from entering the sockets. According to the above description, the safety structure for different situation still cannot avoid sparks generated when a plug is inserted into a socket.

The air is mainly composed by nitrogen and oxygen. Both gases are very stable at room temperature without dissolution and ionization. However, if a sufficient electric field is present in a specific region, the electrons in oxygen and nitrogen will escape from the binding of the atomic nucleus and flow toward the direction with higher voltage. If the electric field is extraordinarily strong, massive electrons will escape the binding and move towards the same direction. Then a conductive path will be formed in the originally insulative air. As the electrons move for a distance and recaptured by the oxygen or nitrogen nuclei, electromagnetic waves will be radiated. In a short time, a great deal of light and electromagnetic waves will heat up the surrounding air, which will expand rapidly after being heated and generate sparks. The sparks enable carbon accumulation on the metal members of sockets; the accumulated carbons increase the impedance of the metal members. Then, the thermal energy generated when currents flow through the metal members will increase owing to the increase of impedance. Consequently, the sockets will be damaged and their lifetime is shortened. Even worse, the thermal energy or sparks will ignite the cases of the sockets or the surrounding flammable objects. In the end, a fire will result.

In addition, if the metal members of a plug is not completely inserted into a socket, the exposed portion of the metal members might lead to electric shocks for people.

Besides, in some places such as hotels, electronic devices with a plug inserted into a socket will be provided to their customers for usage. Since the electronic devices might not be fixed on the wall or desks, some people might unplug the plug from the socket and take the electronic device away. It is difficult for the provider of the electronic device to aware the removal or stealth.

Accordingly, the present invention provides a safety device for socket. The socket will not supply power to a plug and subsequently to the electronic device unless the plug is inserted into the socket. Thereby, the sparks generated when a plug is inserted into a socket can be prevented. The safety device according to the present invention can further confirm complete insertion of a plug before supplying the power. Thereby, the electric shock due to people's contact of the metal members of the plug can be avoided. Moreover, the safety device according to the present invention can further detect unplugging of a plug from a socket and transmitting a warning signal for notifying the monitor if it happens. Then the monitor can acknowledge and usage condition of electronic devices and hence preventing removal or stealth.

SUMMARY

An objective of the present invention is to provide a safety device for socket, which comprises a switching circuit and a detection module. The switching circuit is coupled between a supply main and an internal transmission structure of a socket. The detection module detects if a plug is inserted into the socket. When a plug is not inserted into the socket, the switching circuit is cut off and the power source will not be transmitted to the internal transmission structure via the switching circuit. In other words, the socket does not supply the power source. After a plug is inserted into the socket, the switching circuit is turned on and the power source is transmitted to the internal transmission structure via the switching circuit. Then the power source can be further transmitted to the electronic device connected to the plug. Since the socket does not supply the power source unless the plug is inserted into the socket, the sparks generated at the instant when the external transmission structure of the plug contacts the internal transmission structure of the socket can be prevented and thus improving the safety. Avoiding sparks also reduces carbon accumulation in the socket, and hence extending the lifetime of sockets and preventing fires.

An objective of the present invention is to provide a safety device for socket, which can transmit a warning signal when the detection module detects unplugging of the pug. Thereby, the monitor can acknowledge the usage condition of the electronic devices and hence preventing removal or stealth.

An objective of the present invention is to provide a safety device for socket, which can detect complete insertion of the plug into the external transmission structure using the detection module before the power source is supplied to the socket. Thereby, the electric shock due to people's contact of the metal members of the plug can be avoided.

An objective of the present invention is to provide a safety device for socket, which can detect the condition of the socket when the socket supplies the power source to the plug. Thereby, when the condition of the socket is abnormal, the power source is cut from the socket for preventing fires.

The present invention discloses a safety device for socket, which comprises a switching circuit, a control module, and a detection module. The switching circuit is coupled between a supply main and an internal transmission structure of a socket. The control module is coupled to and controls the switching circuit. The detection module is coupled to the control module and outputs a detection signal.

The control module controls the turning-on or cutoff of the switching circuit according to the detection signal.

DETAILED DESCRIPTION

In order to make the structure and characteristics as well as the effectiveness of the present invention to be further understood and recognized, the detailed description of the present invention is provided as follows along with embodiments and accompanying figures.

The present invention provides a safety device for socket, which comprises a switching circuit, a control module, and a detection module. The switching circuit is coupled between a supply main and an internal transmission structure of a socket. The detection module detects if a plug is inserted into the socket and outputs a detection signal. The control module controls the turning-on or cutoff of the switching circuit according to the detection signal for controlling if the power source from the supply main will be supplied by the socket. When the plug is not inserted into the socket, the control module controls the switching circuit to cut off for not supplying the power source by the socket. After the plug is inserted into the socket, the control module controls the switching circuit to turn on. In other words, the power source will not be supplied to the plug unless the plug is confirmed to be inserted into the socket. Thereby, the sparks can be avoided.

Figure 1:
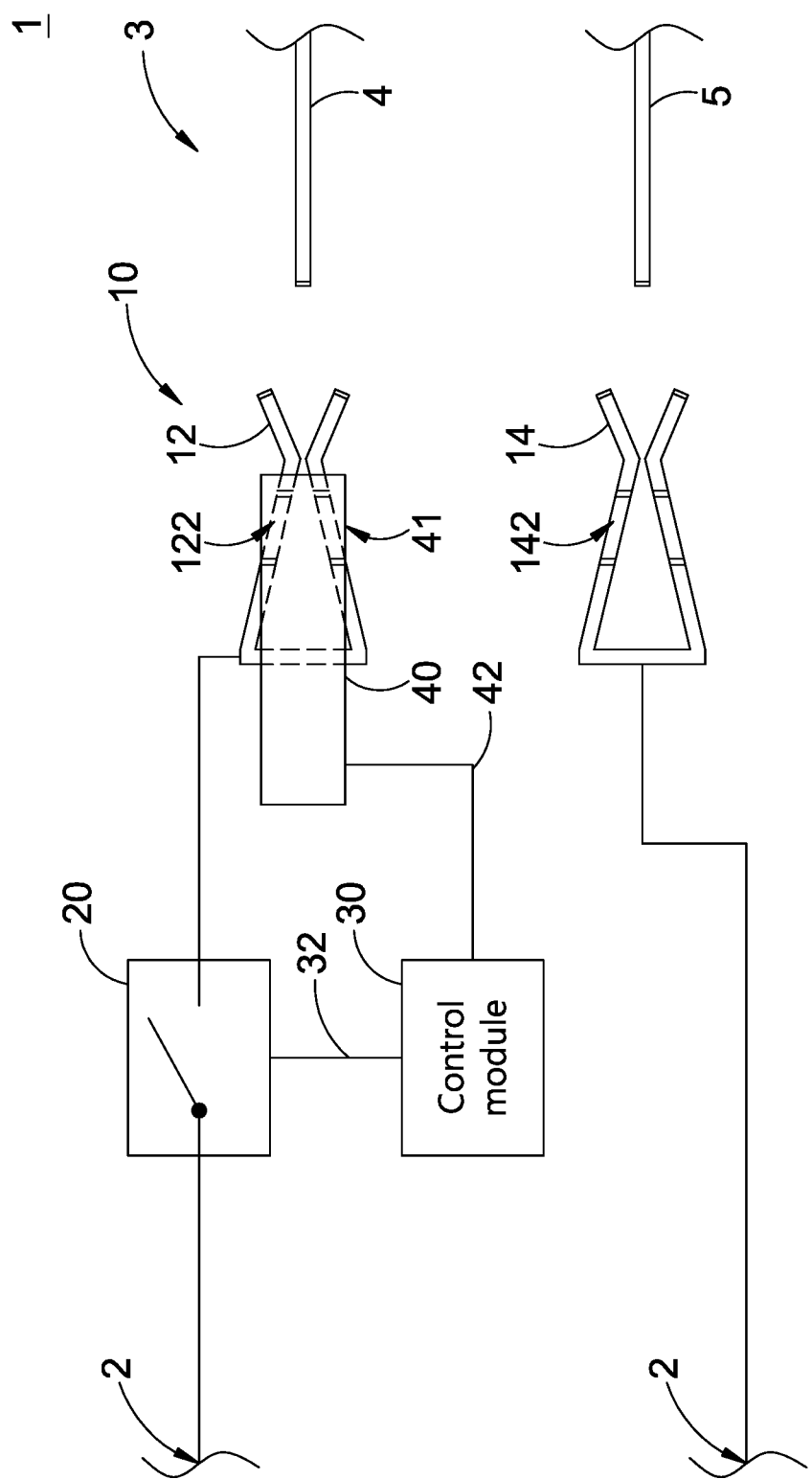
FIG. 1 shows a schematic diagram of not supplying the power source according the first embodiment of the present invention.

Please refer to FIG. 1, which shows a schematic diagram of not supplying the power source according the first embodiment of the present invention. As shown in the figure, the safety device 1 of socket is illustrated. The safety device 1 is applied to a socket. A plug can be inserted into the socket. The plug includes an external transmission structure 3. The safety device 1 comprises a switching circuit 20, a control module 30, and a detection module. According to the present embodiment, the external transmission structure 3 includes a first electrical transmission member 4 and a second electrical transmission member 5 disposed separately and both being metal members. According to an embodiment of the present embodiment, the switching circuit 20 can be a relay.

Figure 2:
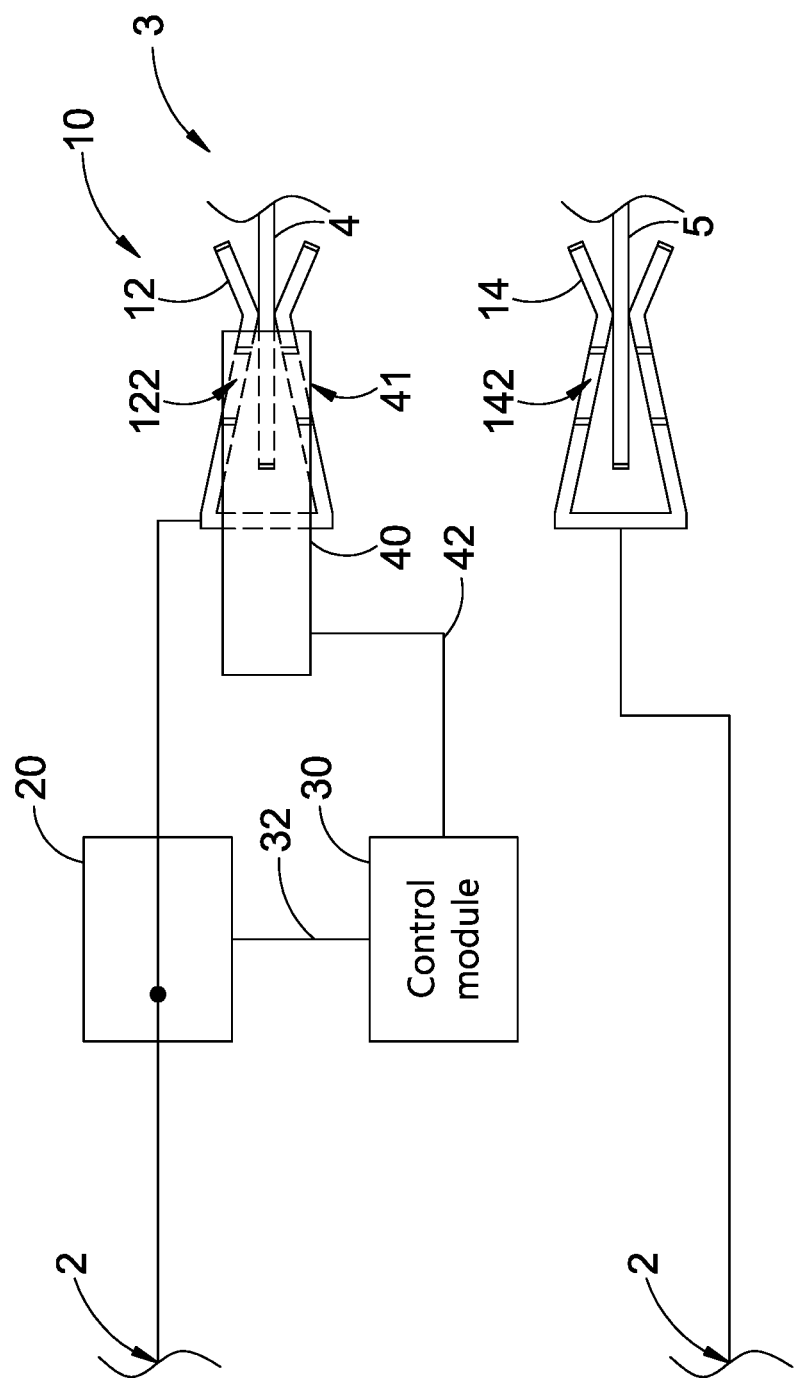
FIG. 2 shows a schematic diagram of supplying the power source according the first embodiment of the present invention.

Please refer to FIG. 1 again and to FIG. 2, which shows a schematic diagram of supplying the power source according the first embodiment of the present invention. As shown in the figures, according to the present embodiment, the socket includes an internal transmission structure 10 coupled to the switching circuit 20. The switching circuit 20 is coupled to a supply main 2. Namely, the switching circuit 20 is located between the supply main 2 and the internal transmission structure 10. The control module 30 is coupled to the switching circuit 20 and transmits a control signal 32 to the switching circuit 20 for controlling its turning-on or cutoff. According to the present embodiment, the detection module includes a trigger, which can be a sensor 40 coupled to the control module 30 and outputs a detection signal 42. One end of the sensor 40 is a contact 41 located in the internal transmission structure 10. According to the present embodiment, the sensor 40 can be a metal object.

The internal transmission structure 10 includes a first electrical transmission member 12 and a second electrical transmission member 14, both being metal objects in a clip shape for clipping the first electrical transmission member 4 and the second electrical transmission members 5 of the external transmission structure 3 of the plug. One end of the first electrical transmission member 12 is coupled to the switching circuit 20. Namely, the switching circuit 20 is coupled between the first electrical transmission member 12 and a live wire of the supply main 2. One end of the second electrical transmission member 14 is coupled to a neutral wire of the supply main 2. Nonetheless. The present invention is not limited to the embodiment. Alternatively, the second electrical transmission member 14 is coupled to the switching circuit 20. Namely, the switching circuit 20 is coupled between the neutral wire of the supply main 2 and the second electrical transmission member 14; the first electrical transmission member 12 is coupled to the live wire of the supply main 2. According to the present embodiment, the first electrical transmission member 4 of the external transmission structure 3 is inserted to the first electrical transmission member 12 of the internal transmission structure 10. The second electrical transmission member 5 of the external transmission structure 3 is inserted to the second electrical transmission member 14 of the internal transmission structure 10 for transmitting power.

Figure 3A:
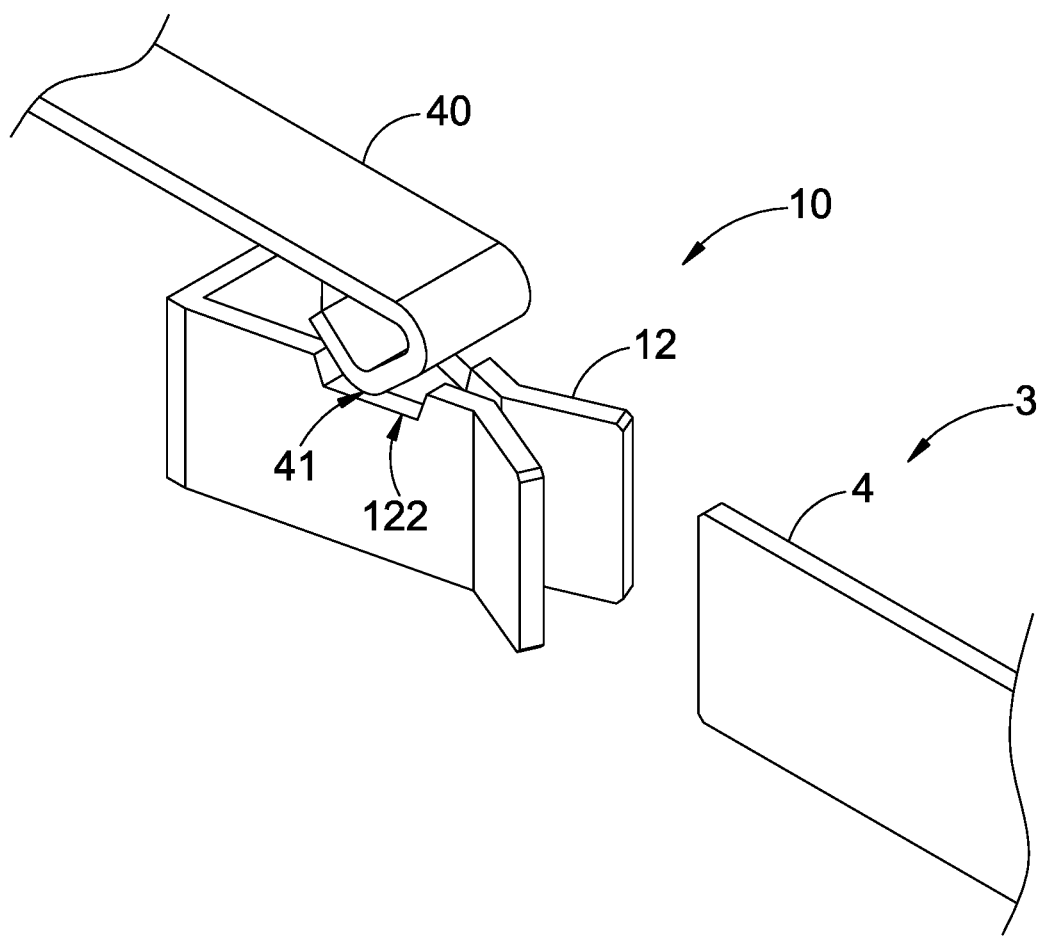
FIG. 3A to 3C show schematic diagrams of the mechanism according the first embodiment of the present invention.
Figure 3B:
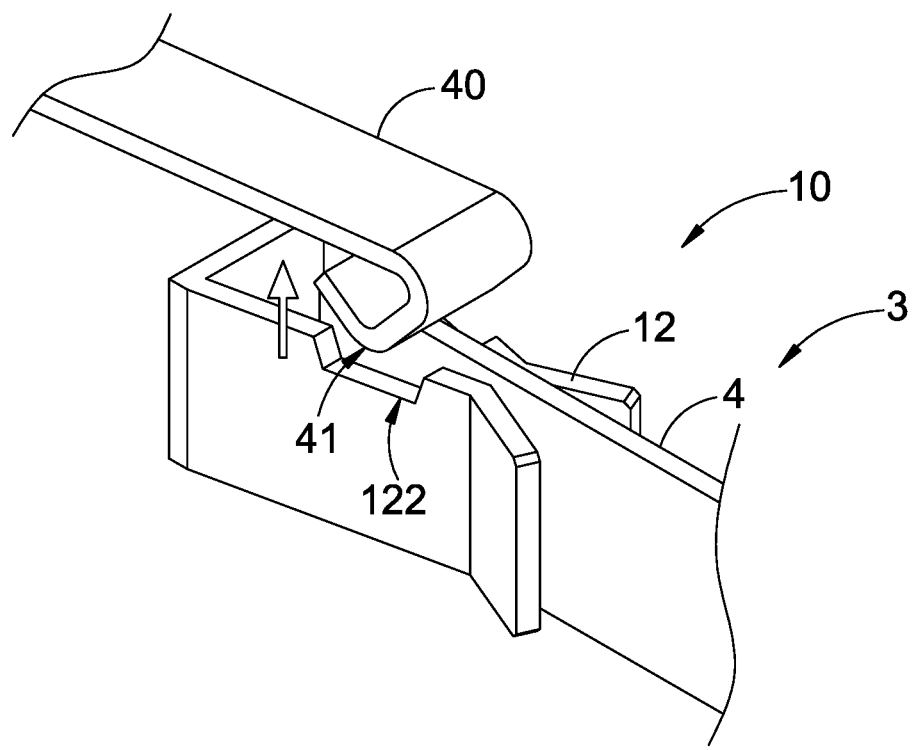
Figure 3C:
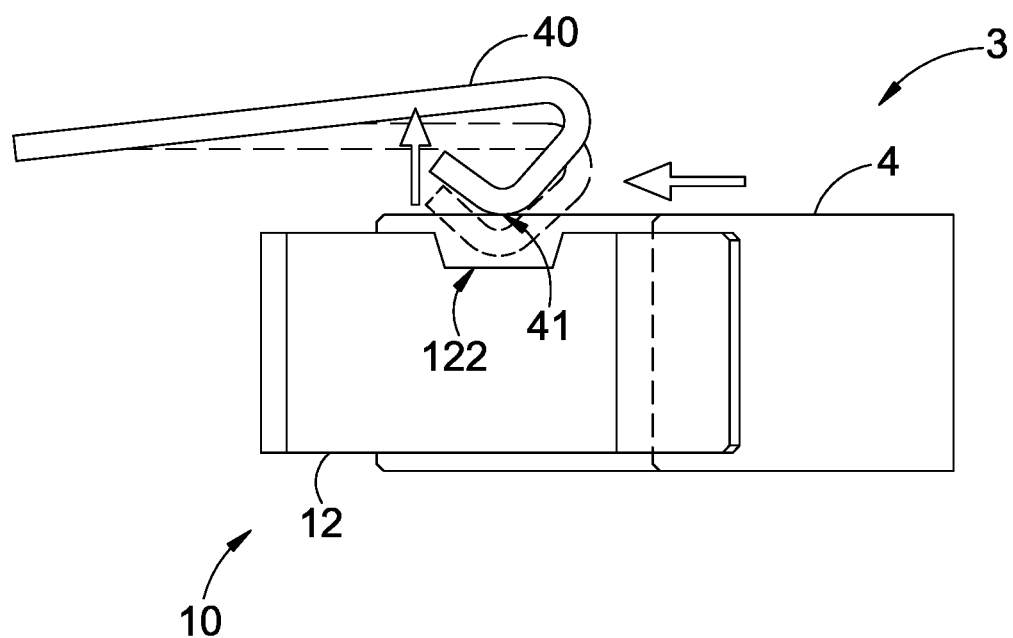
Figure 13:
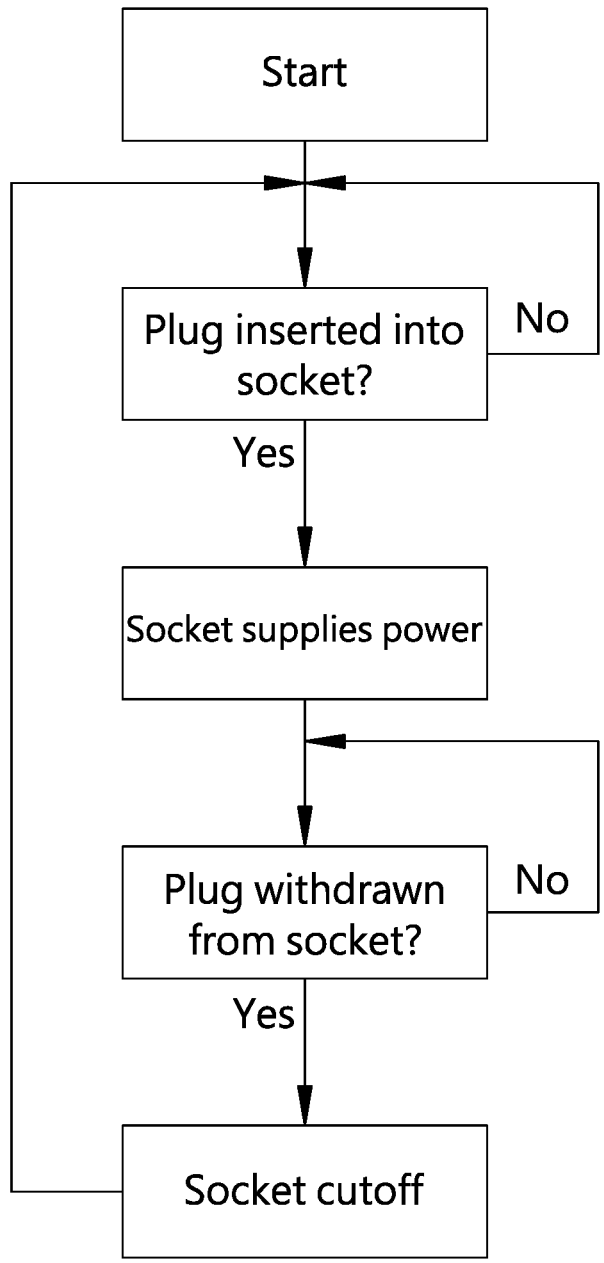
FIG. 13 shows a first flowchart according to the embodiment of the present invention.

Please refer to FIG. 1 and FIG. 2 again, and to FIG. 3A to 3C and FIG. 13. FIG. 3A to 3C show schematic diagrams of the mechanism according to the first embodiment of the present invention; FIG. 13 shows a first flowchart according to the embodiment of the present invention. As shown in the figures, according to the present embodiment, one of or both the first electrical transmission member 12 and the second electrical transmission member 14 includes a spacing recess 122, 142, respectively. The spacing recess 122 is used for spacing the contact 41 of the sensor 40 and the first electrical transmission member 12. Nonetheless, the present invention is not limited to the embodiment. The spacing recess 142 can space the contact 41 of the sensor 40 and the second electrical transmission member 14. In the following, the mechanism of the first electrical transmission member 4 and the first electrical transmission member 12 will be illustrated.

The switching circuit 20 is cut off before the first electrical transmission member 4 is inserted. In other words, the transmission path between the supply main 2 and the first electrical transmission member 12 is not connected. The power source from the supply main 2 will not be transmitted to the first electrical transmission member 12, so that the socket does not supply the power source. After the first electrical transmission member 4 is inserted into and contacts the first electrical transmission member 12, the first electrical transmission member 4 continues to move and contact the contact 41 of the sensor 40 so that the sensor 40 outputs the detection signal 42 to the control module 30. After the control module 30 receives the detection signal 42, it transmits the control signal 32 to the switching circuit 20 according to the detection signal 42 for controlling the switching circuit 20 to turn on. Namely, the transmission path between the first electrical transmission member 12 and the supply main 2 is connected and power source from the supply main 2 is transmitted to the internal transmission structure 10. Since the power source from the supply main 2 is transmitted to the internal transmission structure 10 after the external transmission structure 3 of the plug is confirmed to be inserted into the internal transmission structure 10 of the socket, the damages due to the sparks generated at the instant when the plug is inserted into the socket can be avoided. The spacing recess 122 isolates the contact 41 from contacting the first electrical transmission member 12 so that the sensor 40 will not misidentify the first electrical transmission member 12 for the first electrical transmission member 4. In addition, when the first electrical transmission member 4 continues to move but not contacting the contact 41 of the sensor 40, namely, when the plug is not inserted into the socket completely, switching circuit 20 still will not be turned on. Thereby, the electric shocks owing to people's contact on the external transmission structure 3 will be prevented.

When the first electrical transmission member 4 should be withdrawn from the socket, the first electrical transmission member 4 moves in the first electrical transmission member 12. Then the first electrical transmission member 4 will leave away from the sensor 40 and not contacting the sensor 40. At this time, the control module 30 outputs the control signal 32 to the switching circuit 20 according to the detecting signal 42 of the sensor 40 for controlling the switching circuit 20 to cut off. By driving the internal transmission structure 10 to be disconnected from the power source, the damages on the socket de to the sparks generate when the plug is withdrawn can be avoided. Besides, when the first electrical transmission member 4 is withdrawn and not contacting the sensor 40, if the plug is not moved away from the socket completely, the switching circuit 20 is still not turned on. Thereby, the electric shocks caused by contacting the exposed part of the first electrical transmission member 4 can be prevented.

Please refer again to FIG. 13. As shown in the figure, according to the present embodiment, the sensor 40 is used to detect if the external transmission structure 3 (the plug) has been inserted into the internal transmission structure 10 (the socket). If so, the control module 30 controls the switching circuit 20 to turn on according to the detection signal for enabling the internal transmission structure 10 to supply the power source. If not, the sensor 40 continues detecting. The sensor 40 can further detect if the external transmission structure 3 (the plug) has been withdrawn from the internal transmission structure 10 (the socket). If so, the control module 30 controls the switching circuit 20 to cut off according to the detection signal for enabling the internal transmission structure 10 not to supply the power source. If not, the sensor 40 continues detecting.

Figure 4:
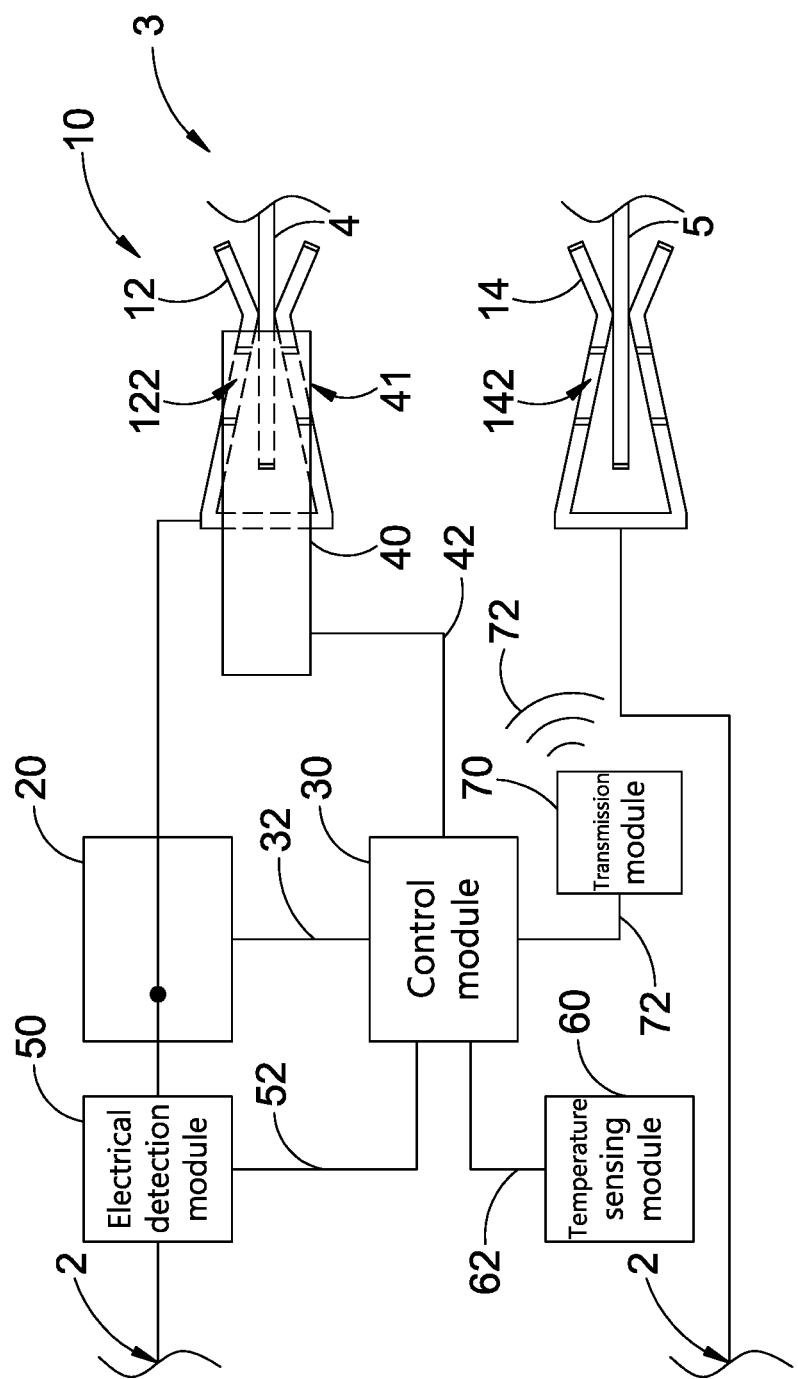
FIG. 4 shows a schematic diagram of the anomaly detection module according the first embodiment of the present invention.

Please refer to FIG. 4, which shows a schematic diagram of the anomaly detection module according the first embodiment of the present invention. As shown in the figure, according to the present embodiment, the present invention further comprises an anomaly detection module and a transmission module 70. The anomaly detection module includes an electrical detection module 50 and a temperature sensing module 60. The electrical detection module 50 is coupled to the supply main 2, the switching circuit 20, and the control module 30. The electrical detection module 50 measures the electrical characteristics, for example, the current or the power, of the external transmission structure 3 and the internal transmission structure 10 when they contact for detecting if the status of the internal transmission structure 10 is abnormal and transmitting a measurement signal 52 to the control module 30. The control module 30 receives the measurement signal 52 and judges if the electrical status of the internal transmission structure 10 is abnormal. The temperature sensing module 60 is coupled to the control module 30. It senses the temperature of the internal transmission structure 10 and outputs a temperature signal 62 to the control module 30. The control module 30 receives the temperature signal 62 for judging if the temperature of the internal transmission structure 10 is abnormal. The above measurement signal 52 and the temperature signal 62 form a detection signal. The transmission module 70 is coupled to the control module 30, which judges if over-loading or over-temperature condition occurs in the internal transmission structure 10 according to the measurement signal 52 and/or the temperature signal 62. If the control module 30 judges according to the measurement signal 52 and/or the temperature signal 62 that the condition of the internal transmission structure 10 is abnormal, it set an anomaly flag and generates a warning signal 72. Then the transmission module 70 transmits the warning signal 72 to notify the monitor of the abnormal condition in the socket. The anomaly flag can be set to a register of the control module 30. According to the present embodiment, the warning signal 72 can be a wireless signal or a wired signal capable of being transmitted to a remote mobile device or server. In addition, the sensor 40 can detect if the plug is inserted into the socket. When the plug is withdrawn from the socket, the control module 30 transmits the warning signal 72 to the monitor for providing the usage status of the socket and preventing movement or stealth of the electronic device coupled to the plug. For example, when the plug of the electronic device is withdrawn by others, an alarm will be submitted.

Figure 14:
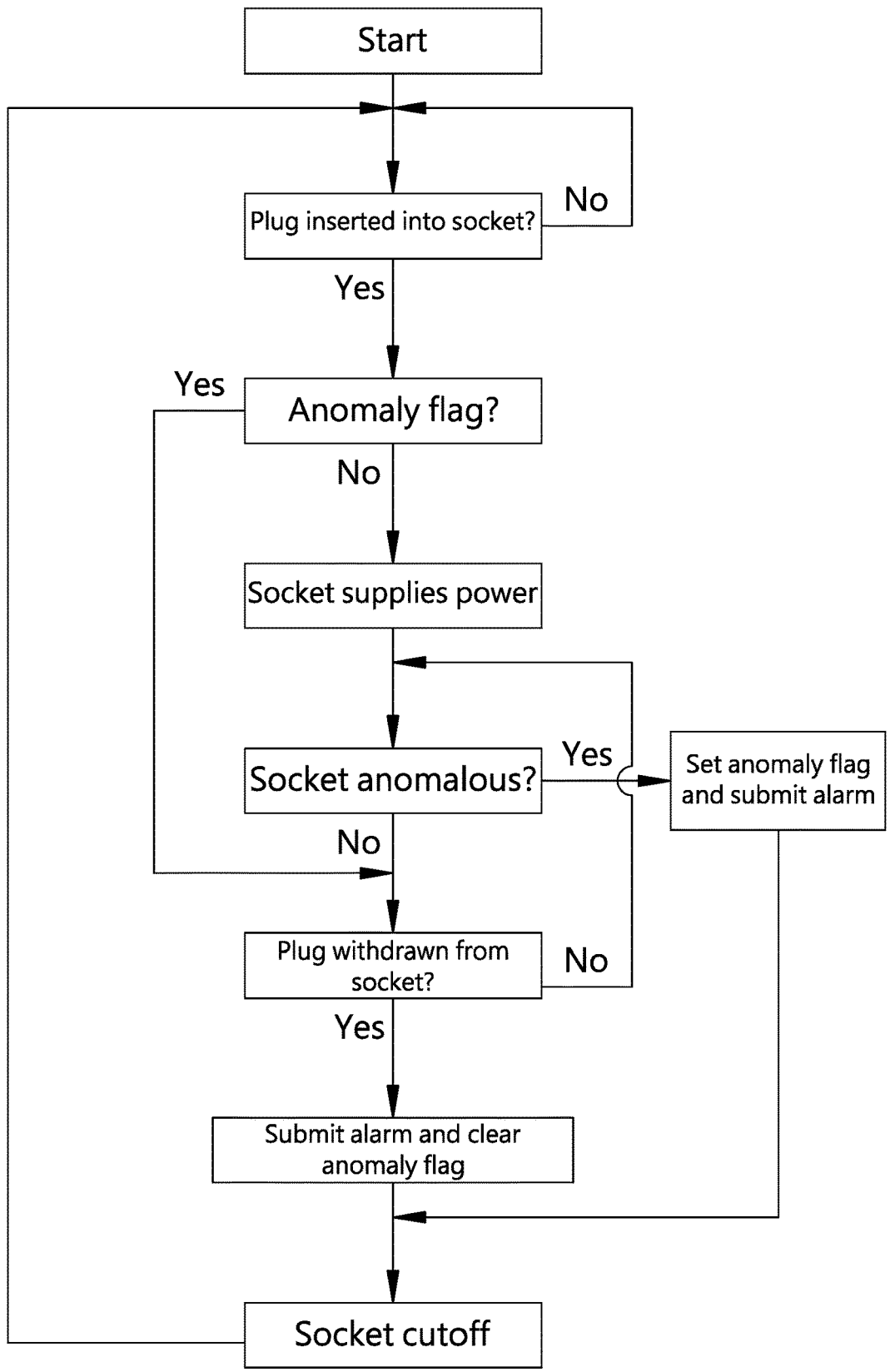
FIG. 14 shows a second flowchart according to the embodiment of the present invention.

Please refer to FIG. 4 again and to FIG. 14, which shows a second flowchart according to the embodiment of the present invention. As shown in the figure, the sensor 40 detects if the external transmission structure 3 is inserted into the internal transmission structure 10. If so, the control module 30 first checks if the anomaly flag is present. If the anomaly flag is not present, the control module 30 controls the switching circuit 20 to turn on for enabling the internal transmission structure 10 to supply the power source. The electrical detection module 50 and the temperature sensing module 60 detects the condition of the internal transmission structure 10. If exceeding the default values, it means that the status of the internal transmission structure 10 is abnormal. Then the control module 30 set the anomaly flag and transmitting the warning signal 72, which indicates occurrence of the over-temperature or over-loading condition, through the transmission module 70. Besides, the control module 30 controls the switching circuit 20 to cut off for driving the internal transmission structure 10 not to supply the power source.

When the control module 30 detects presence of the anomaly flag and the sensor 40 detects withdrawal of the external transmission structure 3 from the internal transmission structure 10, the control module 30 clears the anomaly flag and transmits the warning signal 72 via through the transmission module 70 for warning that the plug has been withdrawn from the socket. Moreover, the control module 30 controls the switching circuit 20 to cut off for driving the internal transmission structure 10 not to supply the power source. Besides, when the control module 30 detects presence of the anomaly flag and the sensor 40 detects that the external transmission structure 3 has not been withdrawn from the internal transmission structure 10, the electrical detection module 50 and the temperature sensing module 60 continue detecting the status of the internal transmission structure 10.

While inserting the plug into the socket, the external transmission structure 3 first moves towards the internal transmission structure 10 before contacting the sensor 40. Then the control module 30 controls the switching circuit 20 to turn on according to the detection signal 42 of the sensor 40. After the external transmission structure 3 is confirmed to contact the internal transmission structure 10, the power source of the supply main 2 is supplied to the internal transmission structure 10. While withdrawing the external transmission structure 3 from the internal transmission structure, the external transmission structure 3 is first disconnected from the sensor 40. The control module 30 controls the switching circuit 20 to cut off according to the detection signal. Then the power source will not be supplied before confirming disconnection of the external transmission structure 3 from the internal transmission structure 10.

Figure 5:
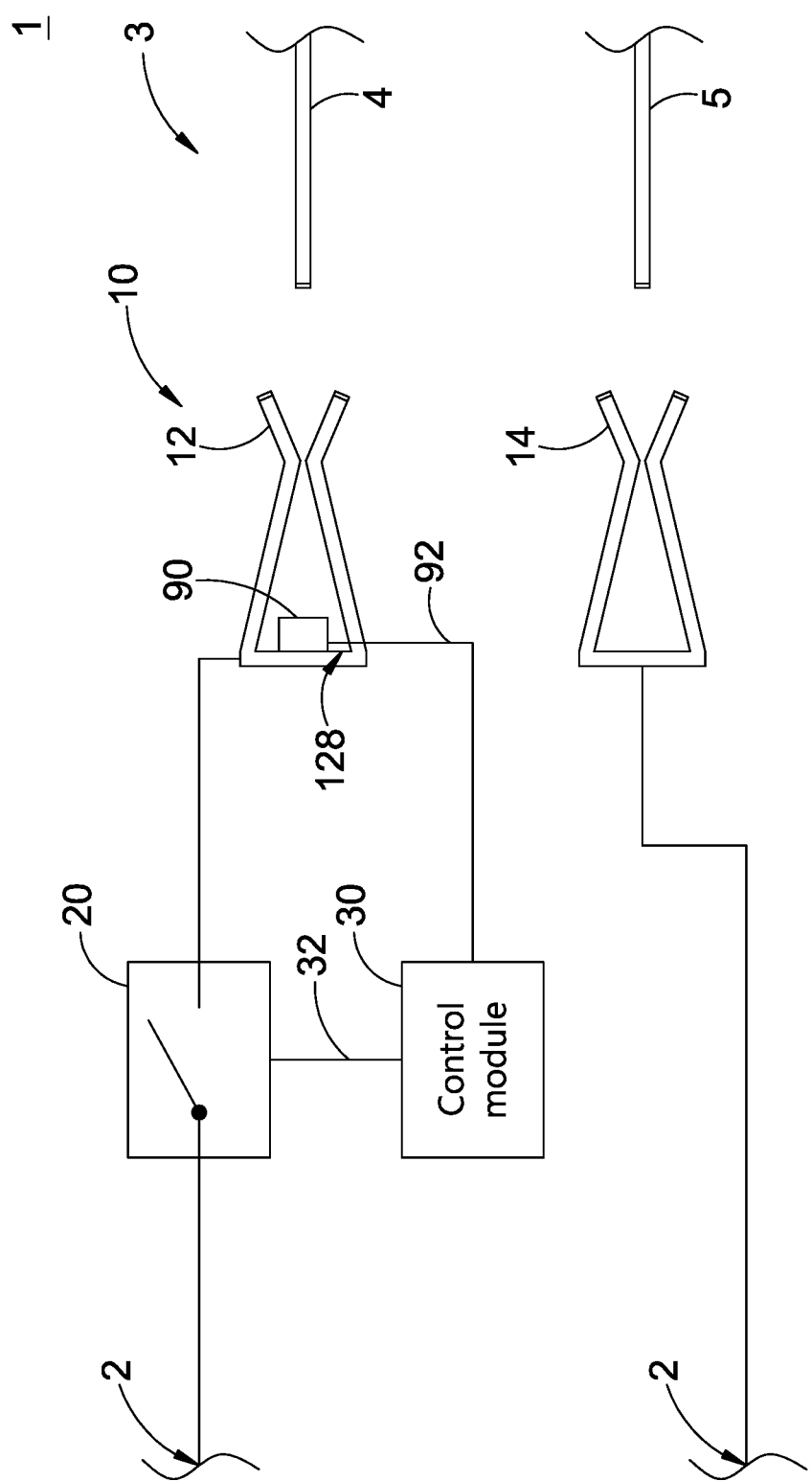
FIG. 5 shows a schematic diagram of not supplying the power source according the second embodiment of the present invention.
Figure 6:
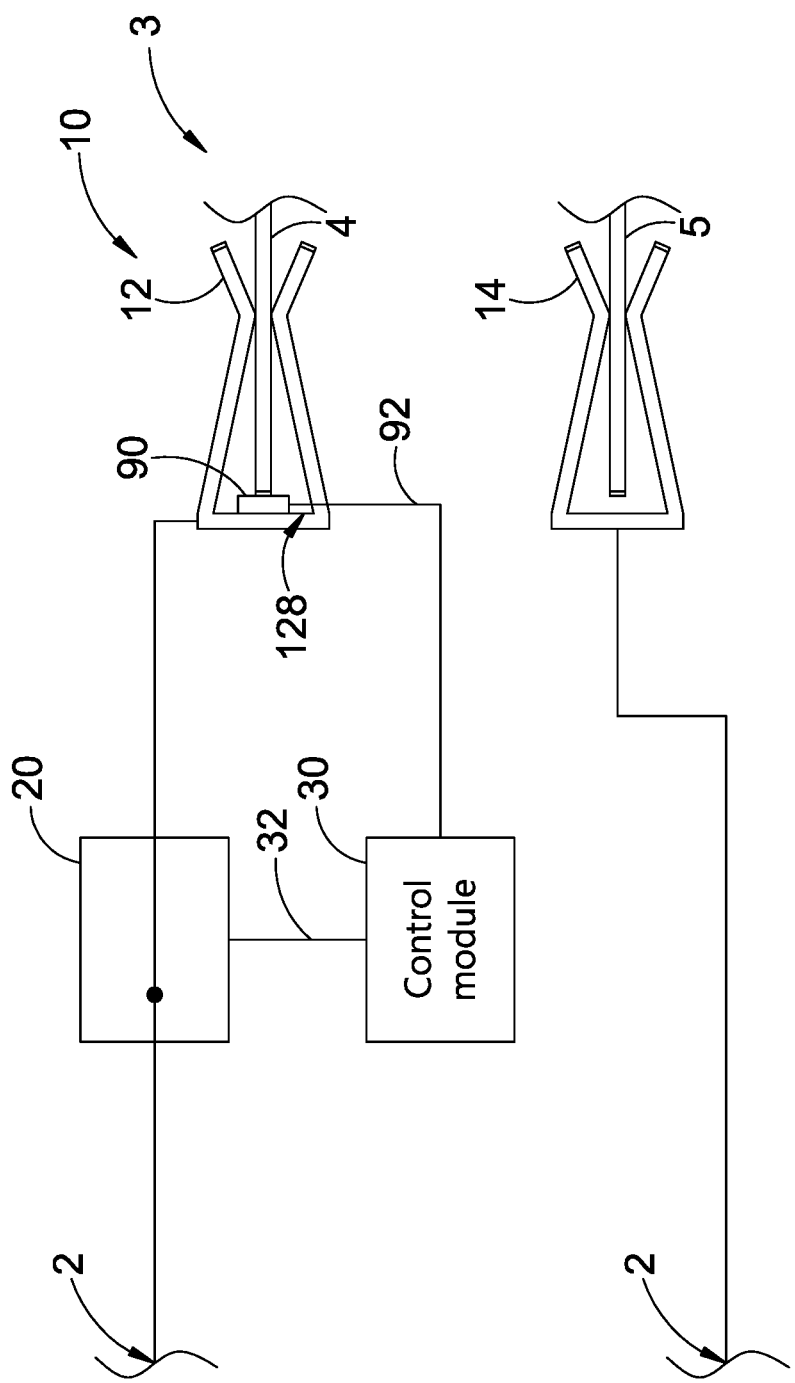
FIG. 6 shows a schematic diagram of supplying the power source according the second embodiment of the present invention.

Please refer to FIG. 5 and FIG. 6, which show schematic diagrams of not supplying the power source and supplying the power source, respectively, according the second embodiment of the present invention. According to the present embodiment, the trigger of the detection module can be a button 90 coupled to the control module 30. The button 90 is disposed on an inner wall 128 of the internal transmission structure 10. According to the present embodiment, the button 90 is disposed on the inner wall 128 of the first electrical transmission member 12. The location of the inner wall 128 corresponds to one end of the external transmission structure 3. In other words, the inner wall 128 is perpendicular to the moving path of the first electrical transmission member 4. When the button 90 is pressed by the first electrical transmission member 4, a detection signal 92 will be transmitted. When the button 90 is not pressed, it recovers to the original condition and no detection signal 92 will be transmitted. The other components and the connection according to the present embodiment are identical to those according to the first embodiment as described above. Hence, the details will not be described again.

Figure 7A:
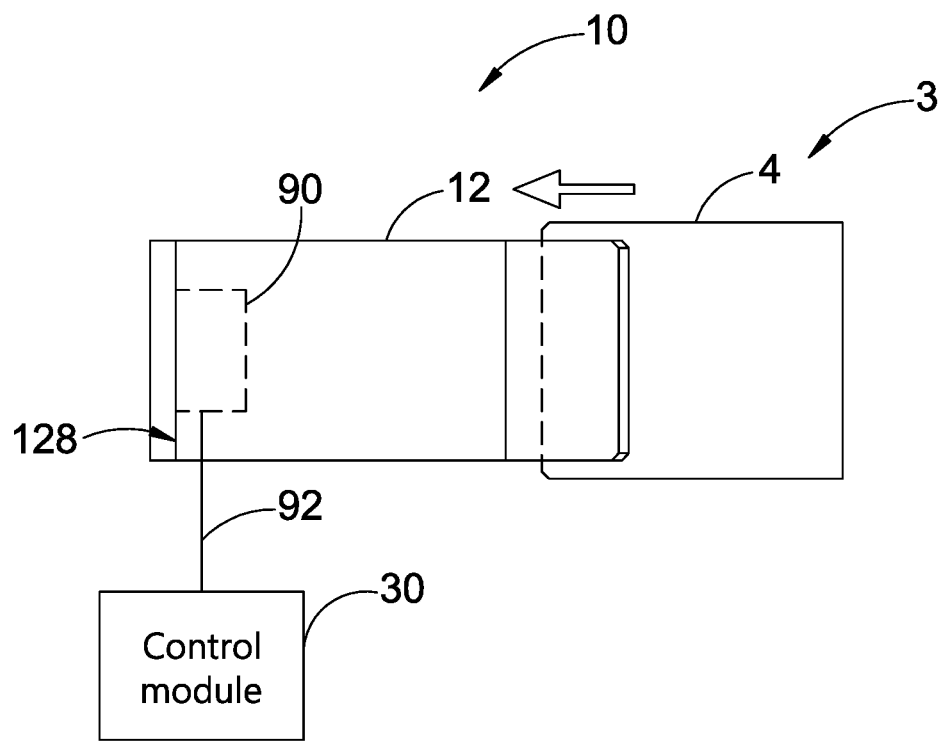
FIG. 7A to 7B show schematic diagrams of the mechanism according the second embodiment of the present invention.
Figure 7B:
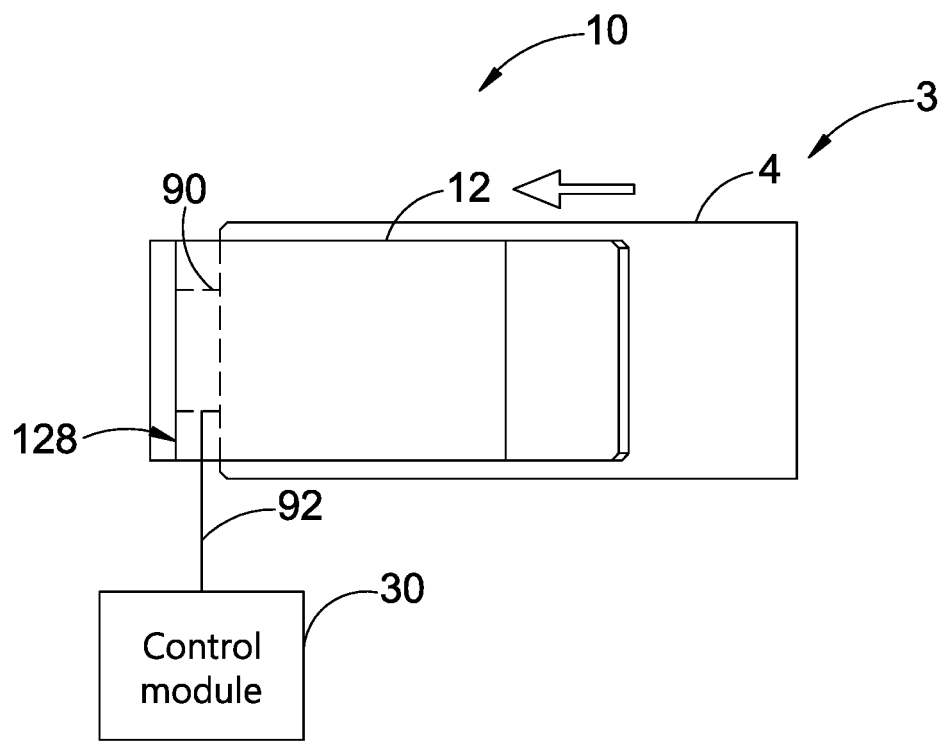

Please refer to FIG. 5 and FIG. 6 again, and to FIG. 7A to 7B, which show schematic diagrams of the mechanism according the second embodiment of the present invention. As shown in the figures, before the first electrical transmission member 4 is inserted into the first electrical transmission member 12, the switching circuit 20 is cut off, cutting off the transmission path between the supply main 2 and the first electrical transmission member 12. After the first electrical transmission member 4 is inserted into and contacts the first electrical transmission member 12, the first electrical transmission member 4 continues moving to the button 90, and presses and moves the button 90. After the button 90 is moved, the detection signal 92 is transmitted to the control module 30. After the control module 30 receives the detection signal 92, the control signal 32 is transmitted to the switching circuit 20 for controlling the switching circuit 20 to turn on. The power source from the supply main 2 is transmitted to the first electrical transmission member 12. Namely, the power source is transmitted to the internal transmission structure 10. In addition, if the first electrical transmission member 4 is inserted into the first electrical transmission member 12 but not pressing or moving the button 90, it means that the plug is not completely inserted into the socket. Then the control module 30 still controls the switching circuit 20 not to turn on for avoiding electric shock on people touching the exposed portion of the external transmission structure 3.

If the first electrical transmission member 4 needs to be withdrawn from the first electrical transmission member 12, the first electrical transmission member 4 moves outwards from the first electrical transmission member 12. First, the first transmission member 4 does not contact the button 90. At this moment, the control module 30 transmits the control signal 32 to the switching circuit 20 for controlling the switching circuit 20 to cut off and enabling the internal transmission structure 10 not to supply the power source. In addition, when the first electrical transmission member 4 has not completely withdrawn from the first electrical transmission member 12, since the first electrical transmission member 4 has released the button 90, the first electrical transmission member 4 will not transmit the power source. Thereby, the electric shocks caused by contacting the exposed part of the first electrical transmission member 4 can be prevented.

Figure 8:
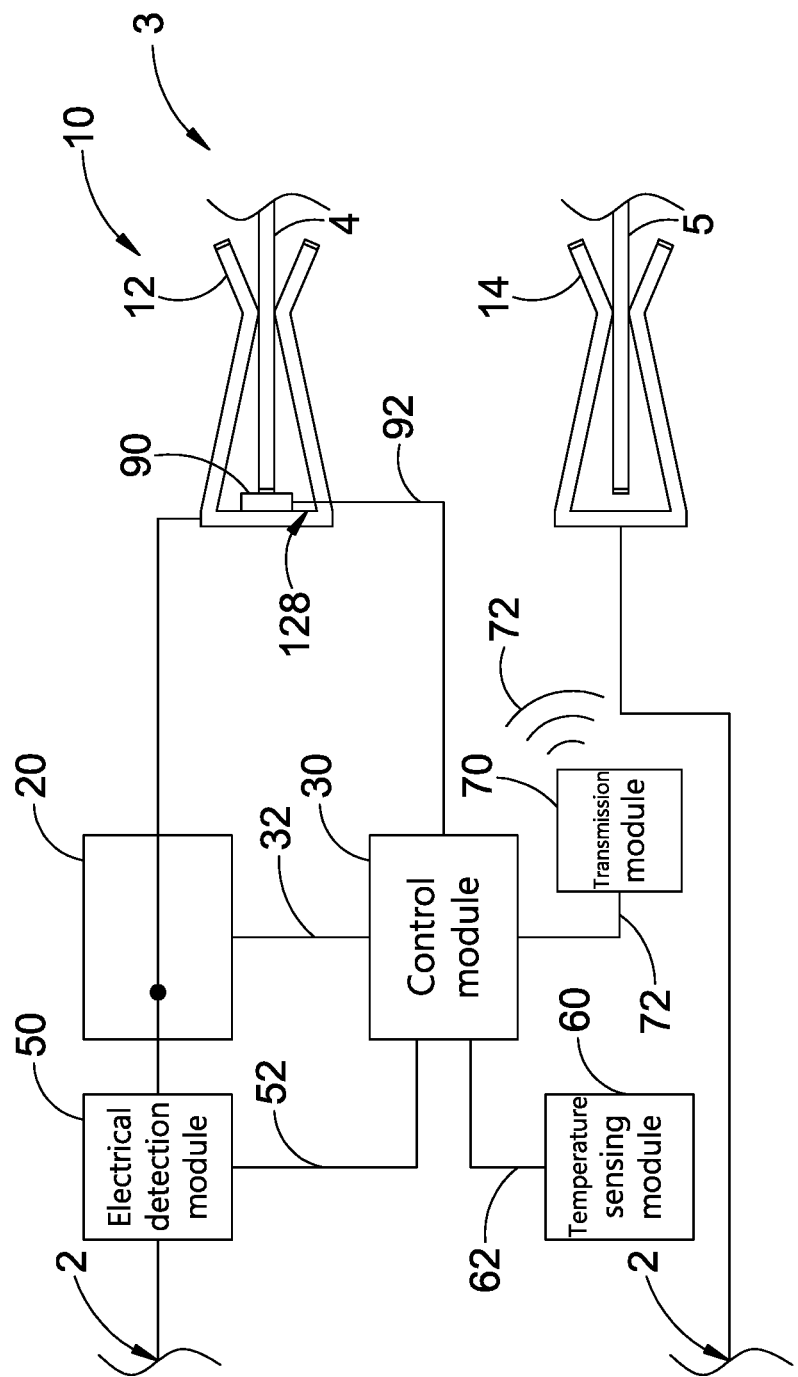
FIG. 8 shows a schematic diagram of the anomaly detection module according the second embodiment of the present invention.

Please refer to FIG. 8, which shows a schematic diagram of the anomaly detection module according the second embodiment of the present invention. As shown in the figure, according to the present embodiment, the present invention further comprises the electrical detection module 50, the temperature sensing module 60, and the transmission module 70. The operation and connection are identical to those according to the first embodiment as described above. Hence, the details will not be described again.

Figure 9:
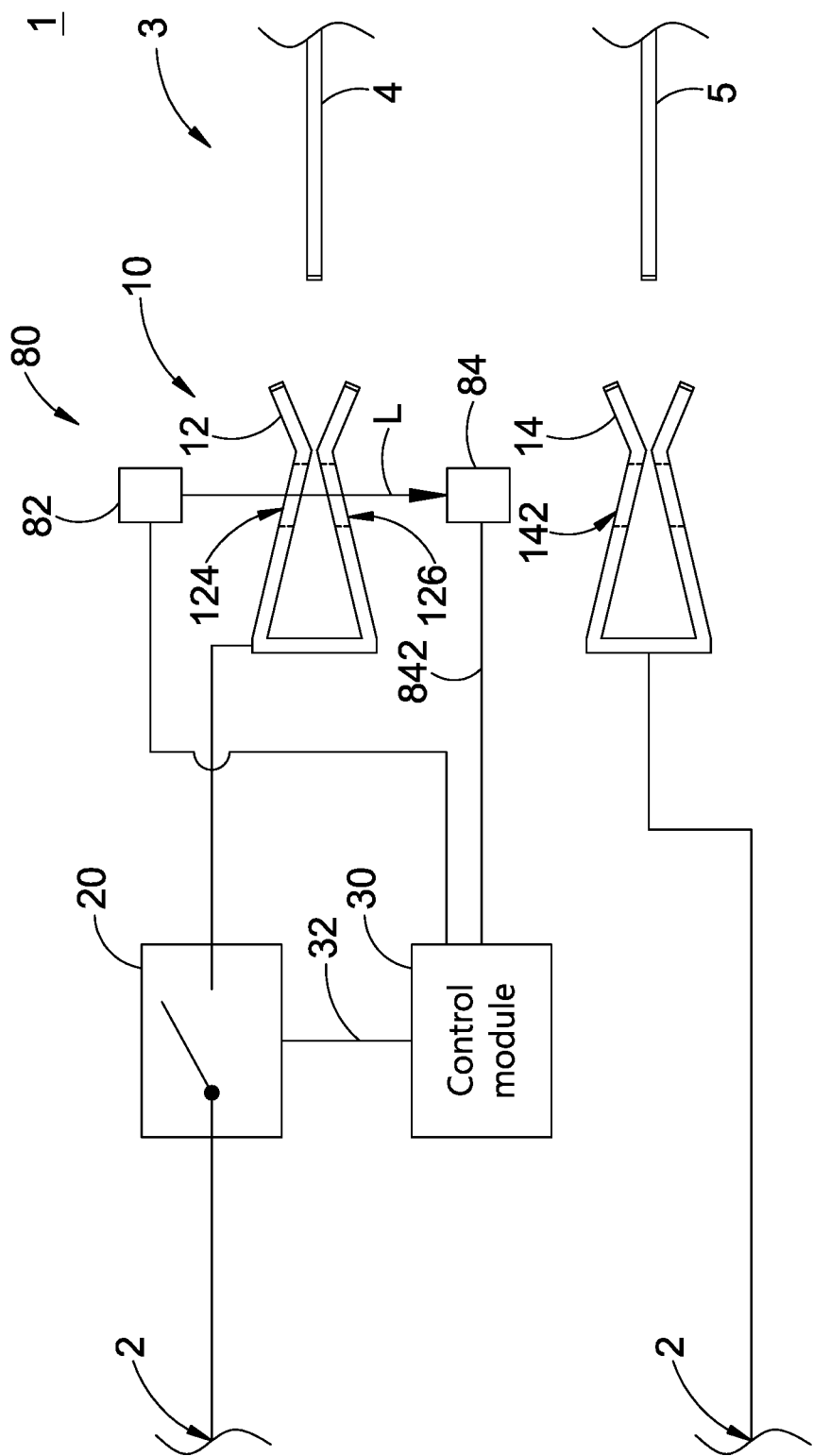
FIG. 9 shows a schematic diagram of not supplying the power source according the third embodiment of the present invention.
Figure 10:
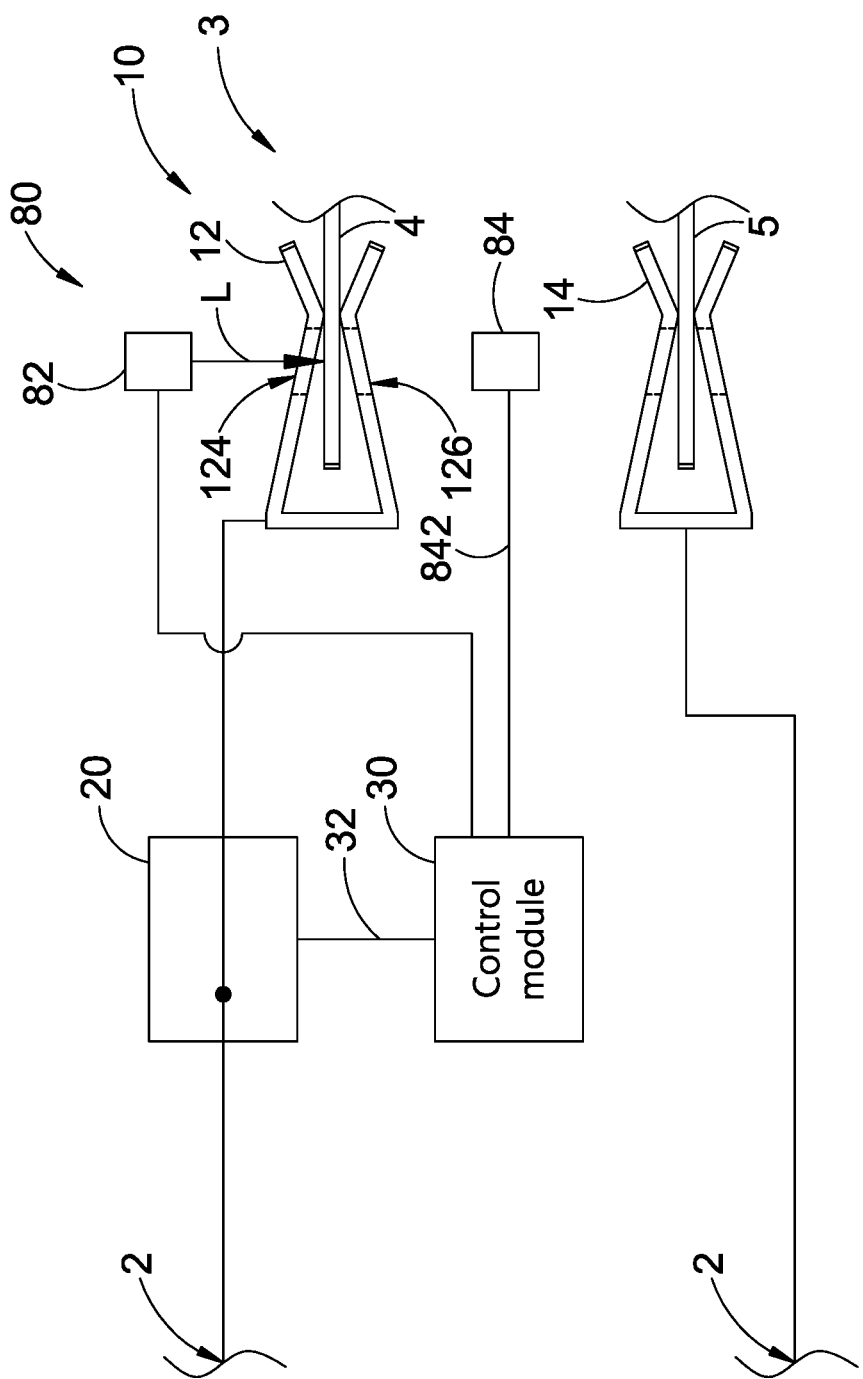
FIG. 10 shows a schematic diagram of supplying the power source according the third embodiment of the present invention.

Please refer to FIG. 9 and FIG. 10, which shows schematic diagrams of not supplying the power source according the third embodiment of the present invention; FIG. 10 shows a schematic diagram of not supplying the power source and supplying the power source, respectively, according the third embodiment of the present invention. As shown in the figures, the detection module 80 according to the present embodiment includes a light-emitting device 82 and a photosensor 84 disposed opposing to each other and at the internal transmission structure 10. The photosensor 84 faces the light-emitting device 82. The light-emitting device 82 emits the light L to the photosensor 84. The photosensor 84 senses the light L and outputs the detection signal 842. The other components and the connection according to the present embodiment are identical to those according to the first embodiment as described above. Hence, the details will not be described again.

Figure 11A:
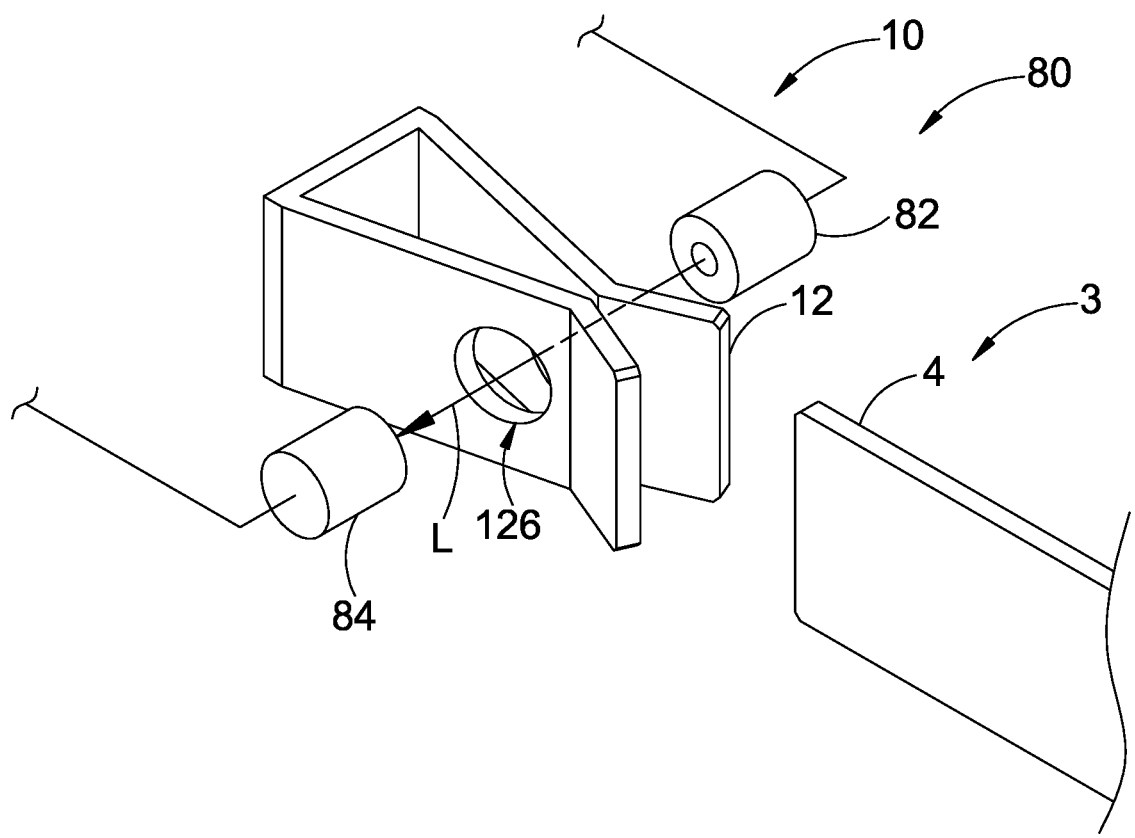
FIG. 11A to 11B show schematic diagrams of the mechanism according the third embodiment of the present invention.
Figure 11B:
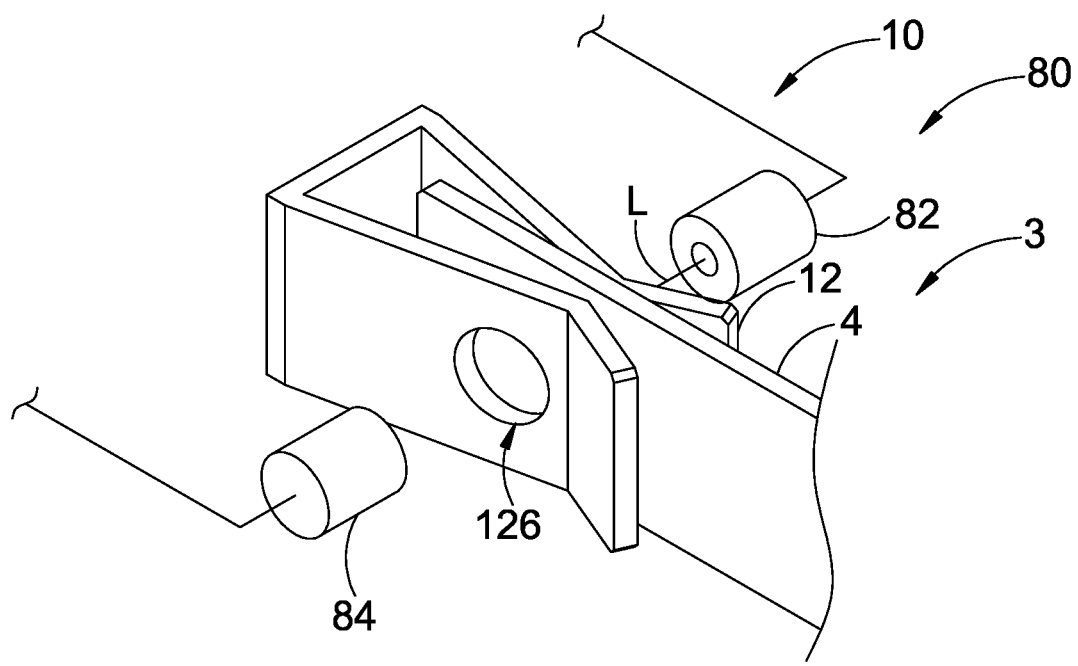

Please refer to FIG. 9 and FIG. 10 again and to FIG. 11A to 11B, which show schematic diagrams of the mechanism according the third embodiment of the present invention. As shown in the figures, the first electrical transmission member 12 includes a first hole 124 and a second hole 126. The light-emitting device 82 is disposed in the first hole 124; the photosensor 84 is disposed in the second hole 126. The light L emitted from the light-emitting device 82 passes through the first hole 124 and the second hole 126 and reaches the photosensor 84, which senses the light L.

The control module 30 controls the switching circuit 20 to cut off before the first electrical transmission member 4 is inserted into the first electrical transmission member 12. In other words, the transmission path between the supply main 2 and the first electrical transmission member 12 will be cut off. After the first electrical transmission member 4 is inserted into and contacts the first electrical transmission member 12, the first electrical transmission member 4 moves to the first hole 124 of the first electrical transmission member 12. The first electrical transmission member 4 blocks the light L. After the first electrical transmission member 4 blocks the light L, the photosensor 84 transmits a detection signal 842 to the control module 30. This detection signal 842 represents that no light L is detected. After the control module 30 receives the detection signal 842, it transmits the control signal to the switching circuit 20 for controlling the switching circuit to turn on and enabling the power source from the supply main 2 is transmitted to the first electrical transmission member 12. Namely, the internal transmission structure 10 starts to supply the power source. Thereby, the sparks generated when the plug is inserted into the socket can be avoided and thus preventing damages and carbon accumulation in the socket. By reducing carbon accumulation in the socket, the heat generated while the socket is supplying power can be lowered. In addition, when the first electrical transmission member 4 moves but not reaching the first hole 124 of the first electrical transmission member 12, since the plug has not completely inserted into the socket, the switching circuit 20 is still not turned on. Thereby, the electric shocks caused by contacting the exposed part of the first electrical transmission member 4 can be prevented.

When the first electrical transmission member 4 needs to be withdrawn from the first electrical transmission member 12, the first electrical transmission member 4 moves away from the first electrical transmission member 12 and then leaves the first hole 124. The photosensor 84 receives the light L and transmits the detection signal 842. Then this detection signal 842 represent detection of the light L. At this moment, the control module 30 transmits the control signal 32 according to the detection signal 842 to the switching circuit 20 for controlling the switching circuit 20 to cut off and driving the first electrical transmission member 12 and the internal transmission structure 10 not to supply the power source. Furthermore, when the first electrical transmission member 4 has not completely left the first electrical transmission member 12, because the first electrical transmission member 4 has left the first hole 124, the switching circuit 20 will be cut off. Thereby, the electric shocks caused by contacting the exposed part of the first electrical transmission member 4 can be prevented.

Figure 12:
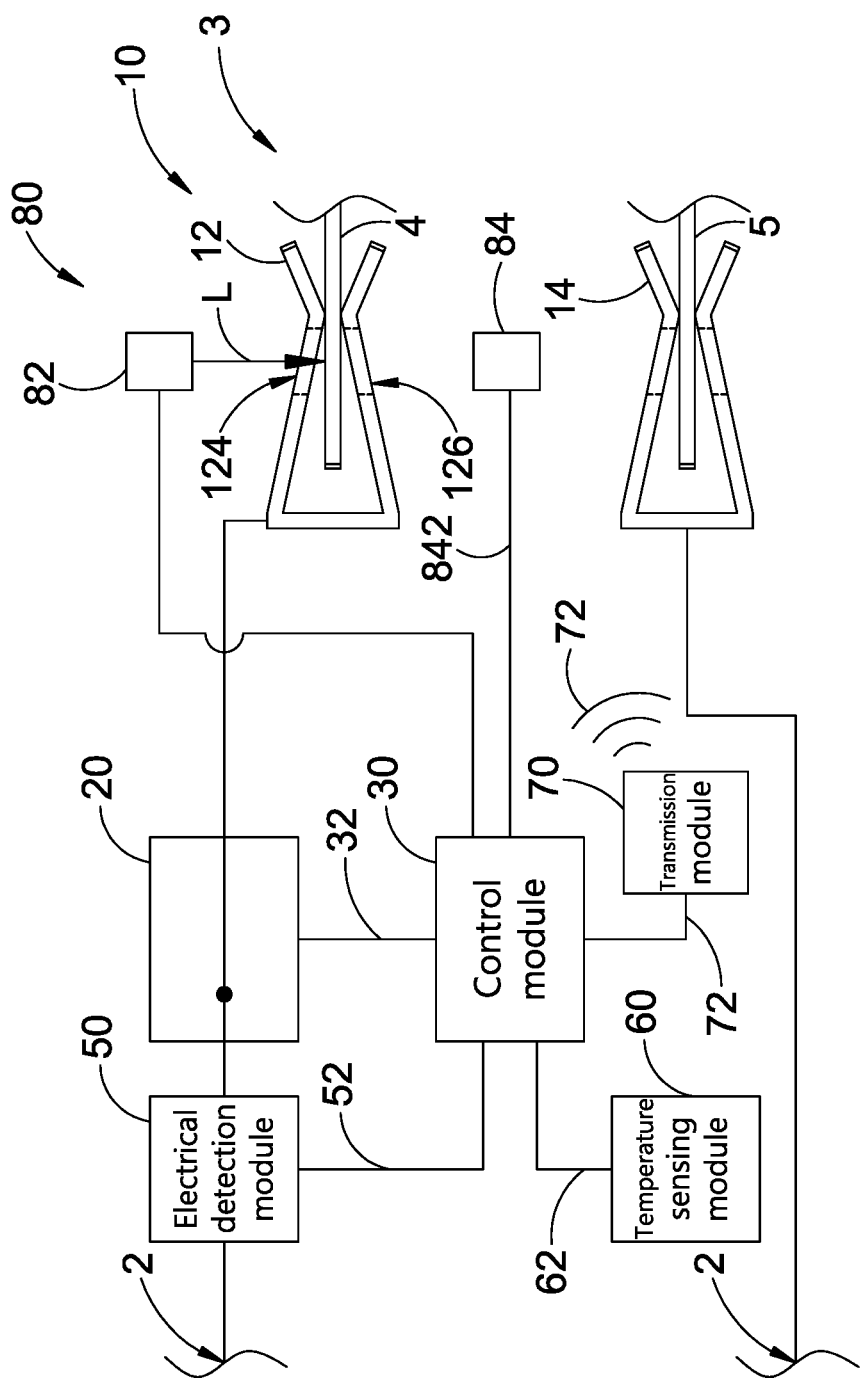
FIG. 12 shows a schematic diagram of the anomaly detection module according the third embodiment of the present invention.

Please refer to FIG. 12, which shows a schematic diagram of the anomaly detection module according the third embodiment of the present invention. As shown in the figure, according to the present embodiment, the present invention further comprises the electrical detection module 50, the temperature sensing module 60, and the transmission module 70. The operation and connection are identical to those according to the first embodiment as described above. Hence, the details will not be described again.

Figure 15A:
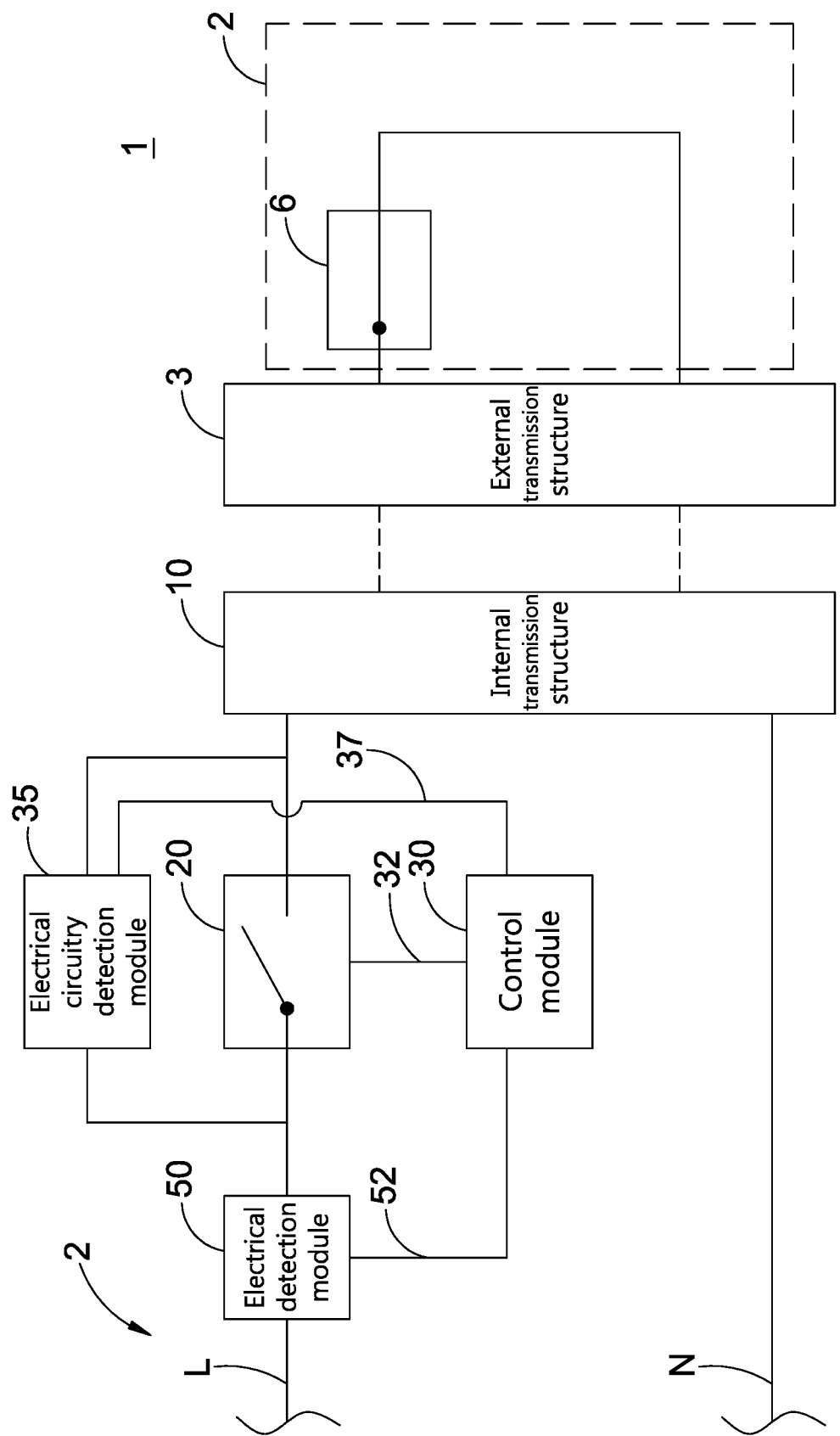
FIG. 15A to 15C show schematic diagrams of the mechanism according the fourth embodiment of the present invention.
Figure 15B:
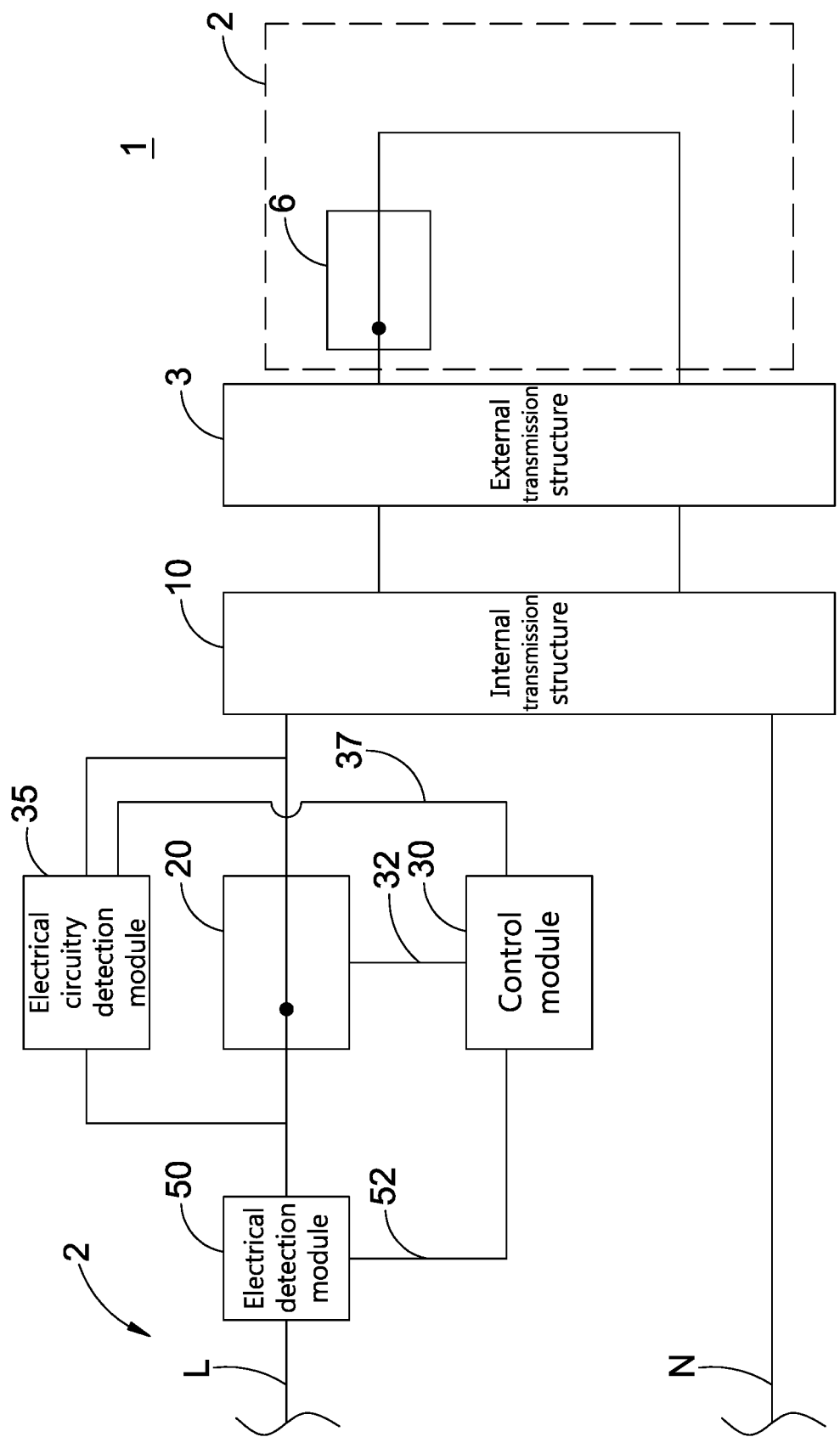
Figure 15C:
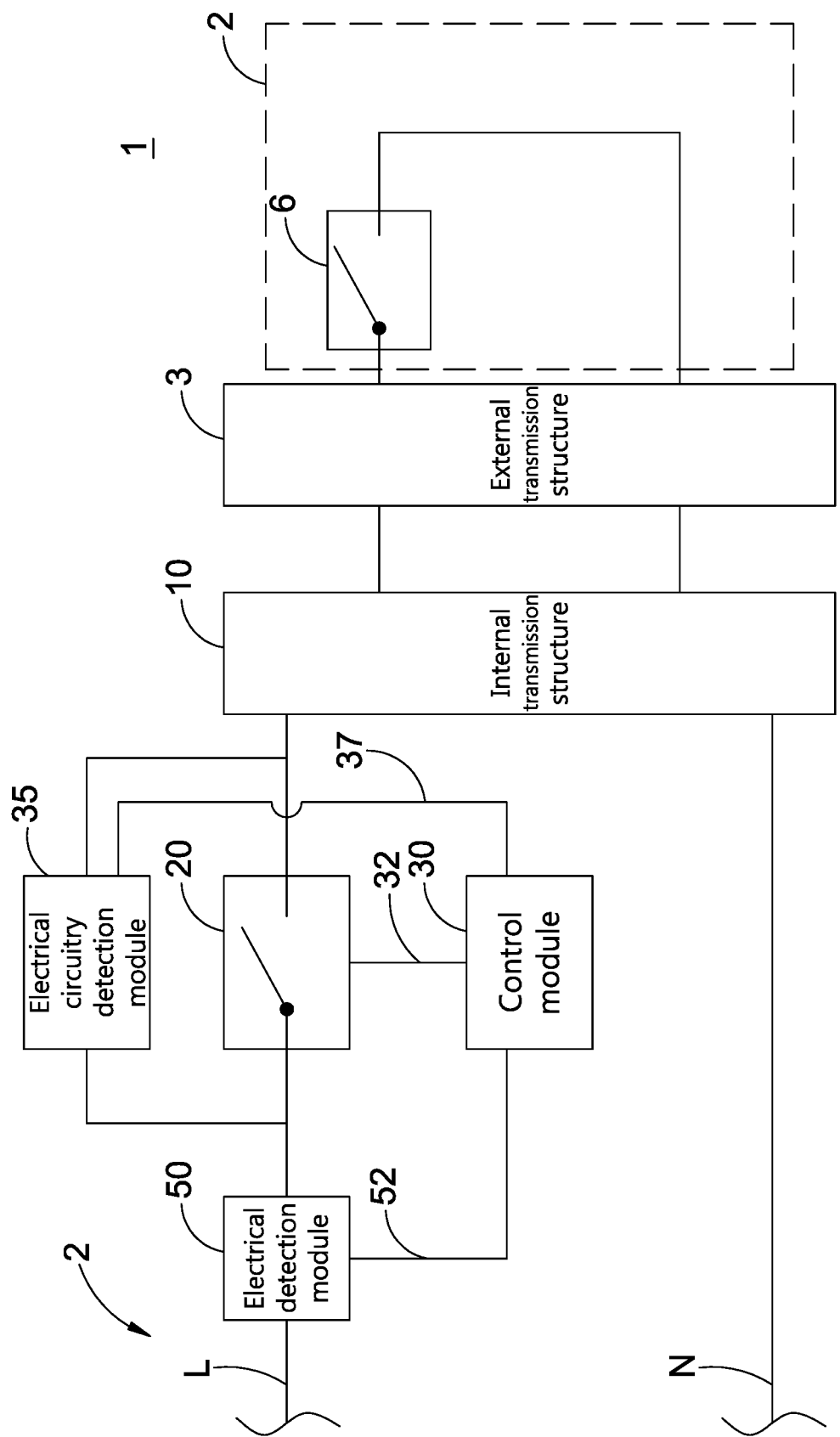
Figure 17:
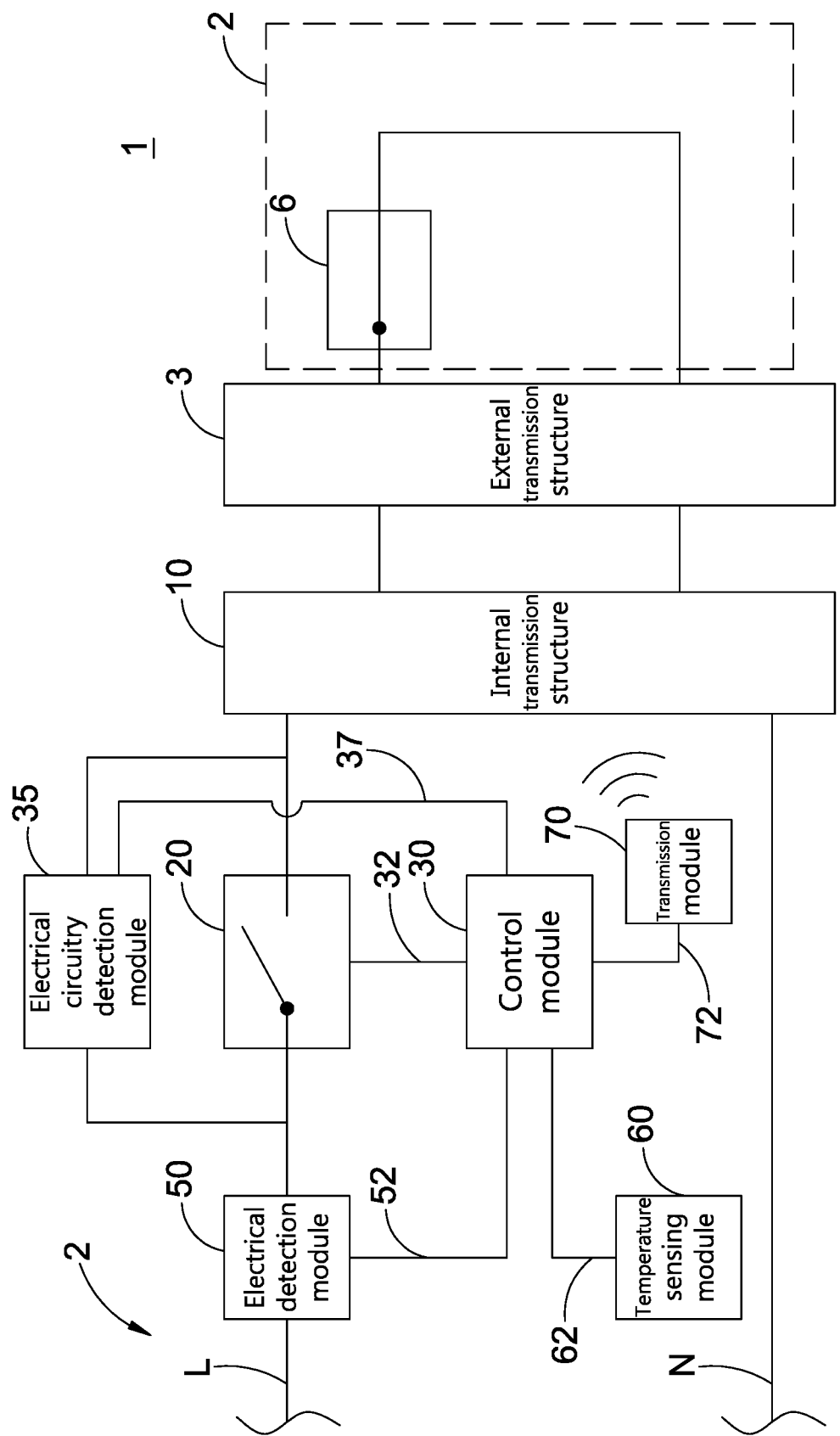
FIG. 17 shows a third flowchart according to the embodiment of the present invention.

Please refer to FIG. 15A to 15C and to FIG. 17. FIG. 15A to 15C show schematic diagrams of the mechanism according the fourth embodiment of the present invention; FIG. 17 shows a third flowchart according to the embodiment of the present invention. According to the present embodiment, an electronic device 2 is connected to the plug, which includes the external transmission structure 3 described above. The electronic device 2 further includes a switch 6 for starting or stopping the electronic device 2. When the switch 6 is closed, the power circuitry of the electronic device 2 is turned on for receiving the power source for operations. Contrarily, when the switch 6 is cut off, the power circuitry of the electronic device 2 is cut off, disabling the electronic device 2 to receive the power source. As shown in FIG. 15A and FIG. 17, the switching circuit 20 is cut off before the external transmission structure 3 of the electronic device 2 is inserted into the internal transmission structure 10 of the socket, and hence disabling the internal transmission structure 10 to supply the power source. According to the present embodiment, the switching circuit 20 can be a relay.

According to the present embodiment, the detection module includes an electrical circuitry detection module 35 and an electrical detection module 50. The electrical circuitry detection module 35 is coupled to the control module 30, the internal transmission structure 10, and the live wire L of the supply main 2. When the plug of the electronic device 2 is inserted into the plug, namely, when the external transmission structure 3 is inserted into the internal transmission structure 10, the electrical circuitry detection module 35 detects the turning-on or cutoff status of the electrical circuitry, for example, the power circuitry, of the electronic device 2 and outputs a detection signal 37 for indicating if the electronic device is turned on. According to an embodiment of the present invention, the electrical circuitry detection module 35 detects if non-negligible voltage or impedance exists in the electronic device 2. The present invention is not limited to detecting non-negligible voltage or impedance. If no non-negligible voltage or impedance exists, it means that the electrical circuitry of the electronic device 2 is cut off. The control module 30 controls the switching circuit 20 to turn on or cut off according to the detection signal of the electrical circuitry detection module 35. When the electrical circuitry is turned on, as shown in FIG. 15B, it means that the external transmission structure 3 of the plug in inserted into the internal transmission structure 10 of the socket. Then the control module 30 controls the switching circuit 20 to turn on. When the electrical circuitry is cut off, it means that the external transmission structure 3 of the plug is not inserted into the internal transmission structure 10 (as shown in FIG. 15A) or the switch 6 of the electronic device 2 is open (as shown in FIG. 15C). Then the control module 30 controls the switching circuit 20 to cut off. According to an embodiment of the present invention, the electrical circuitry detection module 35 is parallel with the switching circuit 20.

Furthermore, when the external transmission structure 3 contacts the internal transmission structure 10 and the power source is transmitted to the electronic device 2, the electrical detection module 50 detects the electrical characteristics of the internal transmission structure 10, namely, the electrical status of the internal transmission structure 10 such as current or power, for judging if the plug of the electronic device 2 has been withdrawn from the socket and generating the detection signal 52 to the control module 30. When the internal transmission structure 10 has transmitted power source to the external transmission structure 3 for supplying the power source to the electronic device 2, the electronic device 2 starts to operate and hence the electrical detection module 50 will detect current and electrical power. If the electrical detection module 50 has not detected current or electrical power consumption, it means that the electronic device 2 stops operating or the plug has been withdrawn from the socket, meaning that the socket need not to supply the power source. The control module 30 controls the switching circuit 20 to cut off according to the detection signal 52 of the electrical detection module 50. According to an embodiment of the present invention, the detection signal 52 also acts as the detection signal provided to the control module 30. In addition, when the internal transmission structure 10 has transmitted the power source to the external transmission structure 3 and hence supplying the power source to the electronic device 2, if no electrical characteristic, such as current or electrical power, is detected, it means that the electronic device 2 is not operating. The electrical detection module 50 will continue detecting for a predetermined time. If the electrical detection module 50 continues to detect no electrical characteristic within the predetermined time, it means that the internal transmission structure 10 does not transmit power source within the predetermined time. At this time, the control module 30 judges that the electronic device 2 is not operating or has been withdrawn from the socket and hence controls the switching circuit 20 to cut off. Them the electrical circuitry detection module 35 re-detect of the electrical circuitry of the electronic device 2 is turned on. According to the present embodiment, the predetermined time can be set according to user's requirements. For example, the predetermined time can be, but not limited to, 50 seconds, 30 minutes, 2 hours, or 4 days.

Figure 16:
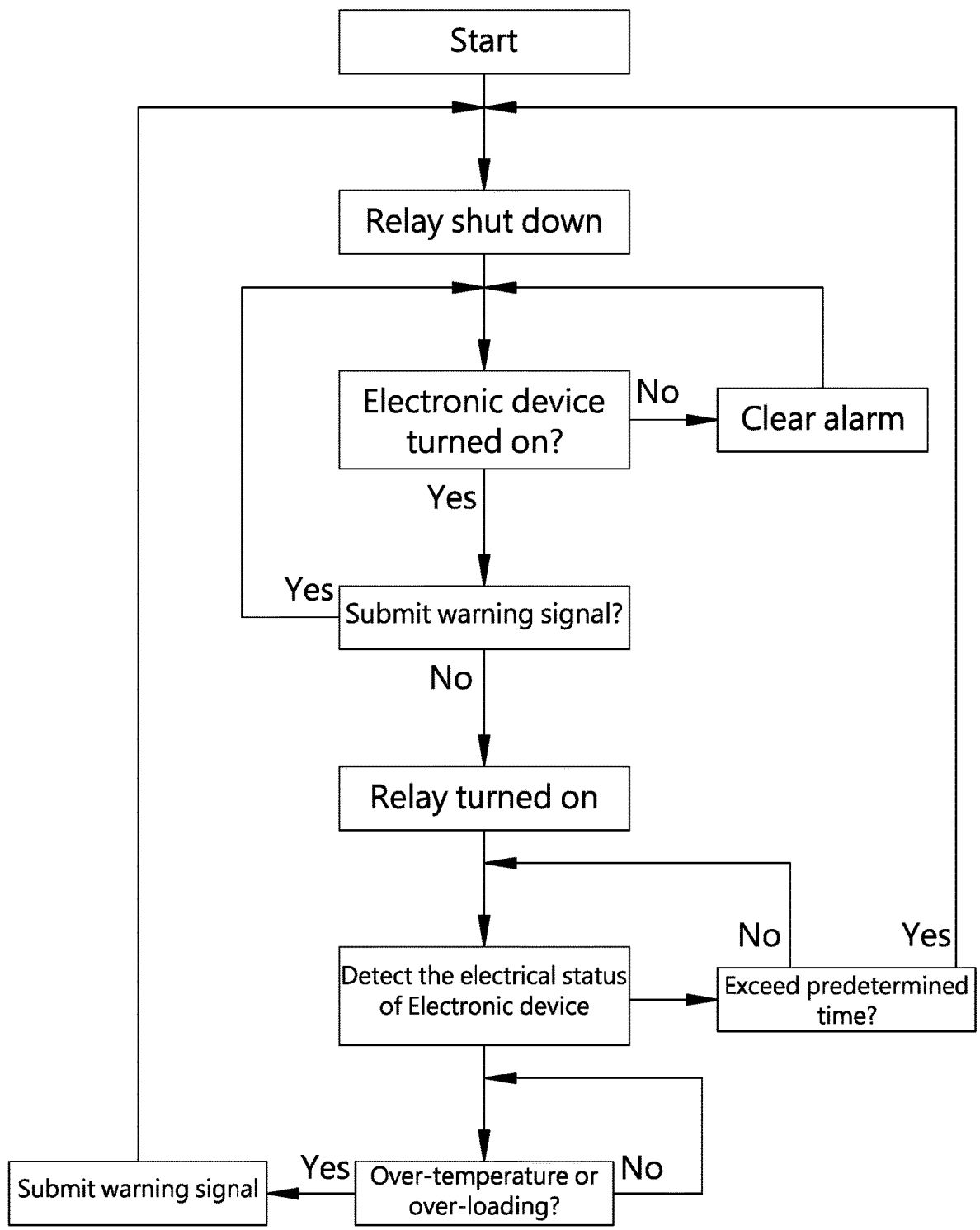
FIG. 16 shows a schematic diagram of the anomaly detection module according the fourth embodiment of the present invention.

Please refer to FIG. 16, which shows a schematic diagram of the anomaly detection module according the fourth embodiment of the present invention. As shown in the figure, according to the present embodiment, the present invention further comprises the temperature sensing module 60 and the transmission module 70. The operation and connection are identical to those according to the first embodiment as described above. Hence, the details will not be described again. As shown in FIG. 17, when the overloading or over-temperature condition occurs at the internal transmission structure 10 of the socket, the transmission module 70 will submit the warning signal.

Accordingly, the present invention conforms to the legal requirements owing to its novelty, nonobviousness, and utility. However, the foregoing description is only embodiments of the present invention, not used to limit the scope and range of the present invention. Those equivalent changes or modifications made according to the shape, structure, feature, or spirit described in the claims of the present invention are included in the appended claims of the present invention.

What is claimed is:

1. A safety device for socket, comprising:
    a switching circuit, coupled between a supply main and an internal transmission structure of a socket;
    a control module, coupled to said switching circuit, and controlling said switching circuit; and
    a detection module, coupled to said control module, and outputting a detection signal, said detection module including a trigger;
    wherein said control module controls said switching circuit to turn on or cut off according to said detection signal, when an external transmission structure of a plug contacts said internal transmission structure of said socket, said external transmission structure contacts said trigger, said trigger outputs said detection signal, and said control module controls said switching circuit to turn on according to said detection signal.

2. The safety device for socket of claim 1, wherein said internal transmission structure includes a first electrical transmission member and a second electrical transmission member; said switching circuit is coupled between said first electrical transmission member and a live wire of said supply main or between said second electrical transmission member and a neutral wire of said supply main.

3. The safety device for socket of claim 1, wherein when said detection module detects an external transmission structure of a plug contacting said internal transmission structure of said socket, said detection module outputs said detection signal, and said control module controls said switching circuit to turn on according to said detection signal.

4. The safety device for socket of claim 1, wherein said trigger is a sensor spaced in said internal transmission structure; when said external transmission structure contacts said internal transmission structure, said external transmission structure contacts said sensor; said sensor outputs said detection signal; and said control module controls said switching circuit to turn on according to said detection signal.

5. The safety device for socket of claim 4, wherein said internal transmission structure includes two electrical transmission members; one or more of said electrical transmission members includes a spacing recess for spacing said one or more electrical transmission member and said sensor.

6. The safety device for socket of claim 1, wherein said trigger is a button; when said external transmission structure of said plug contacts said internal transmission structure of said socket, said external transmission structure presses said button; said button outputs said detection signal; and said control module controls said switching circuit to turn on according to said detection signal.

7. The safety device for socket of claim 1,
    further comprising an anomaly detection module coupled to said control module, detecting if anomaly occurs in said internal transmission structure and generating a detection signal, and said control module controlling said switching circuit to cut off according to said detection signal of said anomaly detection module.

8. The safety device for socket of claim 7, wherein when said anomaly detection module detects the status of said internal transmission structure to be abnormal, said control module generates a warning signal according to said detection signal of said anomaly detection module.

9. The safety device for socket of claim 8, wherein when said anomaly detection module includes an electrical detection module for detecting the electrical status of said internal transmission structure and generating said detection signal of said anomaly detection module.

10. The safety device for socket of claim 8, wherein when said anomaly detection module includes a temperature sensing module for detecting a temperature of said internal transmission structure and generating said detection signal of said anomaly detection module.

11. The safety device for socket of claim 1, wherein when said detection module detects that said external transmission structure of said plug does not contact said internal transmission structure of said socket, said detection module outputs said detection signal; said control module controls said switching circuit to cut off according to said detection signal; and said control module generates a warning signal.

12. The safety device for socket of claim 11, further comprising a transmission module coupled to said control module for transmitting said warning signal.

13. A safety device for socket, comprising:
 a switching circuit, coupled between a supply main and an internal transmission structure of a socket;
 a control module, coupled to said switching circuit, and controlling said switching circuit; and
 a detection module, coupled to said control module, and outputting a detection signal;
 wherein said control module controls said switching circuit to turn on or cut off according to said detection signal, said detection module includes an electrical circuitry detection module coupled to said internal transmission structure and said supply main; when an external transmission structure of a plug contacts said internal transmission structure of said socket, said electrical circuitry detection module detects an electrical circuitry between said socket and said plug and outputs said detection signal; and said control module controls said switching circuit to turn on according to said detection signal.

14. The safety device for socket of claim 13, wherein said detection module further includes an electrical detection module; when said external transmission structure contacts said internal transmission structure and said switching circuit is turned on, said electrical detection module detects the electrical condition of said internal transmission structure and generates a detection signal as said detection signal; and said control module controls said switching circuit to cut off according to said detection signal of said electrical detection module.

15. The safety device for socket of claim 14, wherein when said external transmission structure contacts said internal transmission structure and said switching circuit is turned on, if said electrical detection module detects that said internal transmission structure does not transmit electric power for a predetermined time, said control module controls said switching circuit to cut off.

16. The safety device for socket of claim 1, wherein said detection module includes a light-emitting device and a photosensor disposed at said internal transmission structure; said photosensor is opposing to said light-emitting device for sensing the light generated by said light-emitting device; when an external transmission structure of a plug contacts said internal transmission structure of said socket, said external transmission structure is located between said photosensor and said light-emitting device and blocks the light generated by said light-emitting device from emitting to said photosensor; said photosensor outputs said detection signal; and said control module controls said switching circuit to turn on according to said detection signal.

17. The safety device for socket of claim 16, wherein said internal transmission structure includes a first electrical transmission member and a second electrical transmission member; and said light-emitting device and said photosensor are disposed at said first electrical transmission member and said second electrical transmission member, respectively.

18. The safety device for socket of claim 13, further comprising an anomaly detection module coupled to said control module, detecting if anomaly occurs in said internal transmission structure and generating a detection signal, and said control module controlling said switching circuit to cut off according to said detection signal of said anomaly detection module.

19. The safety device for socket of claim 18, wherein when said anomaly detection module detects the status of said internal transmission structure to be abnormal, said control module generates a warning signal according to said detection signal of said anomaly detection module.

* * * * *